(12) United States Patent
Sakhnini et al.

(10) Patent No.: US 12,074,746 B2
(45) Date of Patent: Aug. 27, 2024

(54) TIME DIVISION MULTIPLEXED USER EQUIPMENT (UE) DATA FOR GUARD INTERVAL (GI)-BASED WAVEFORMS

(71) Applicant: QUALCOMM Incorporated, San Diego, CA (US)

(72) Inventors: Iyab Issam Sakhnini, San Diego, CA (US); Tao Luo, San Diego, CA (US); Xiaoxia Zhang, San Diego, CA (US); Jing Sun, San Diego, CA (US); Morteza Soltani, San Diego, CA (US); Jun Ma, San Diego, CA (US); Peter Gaal, San Diego, CA (US); Junyi Li, Fairless Hills, PA (US)

( * ) Notice: Subject to any disclaimer, the term of this patent is extended or adjusted under 35 U.S.C. 154(b) by 299 days.

(21) Appl. No.: 17/655,339

(22) Filed: Mar. 17, 2022

(65) Prior Publication Data
US 2023/0318892 A1 Oct. 5, 2023

(51) Int. Cl.
*H04L 27/26* (2006.01)
*H04L 5/00* (2006.01)

(52) U.S. Cl.
CPC ........ *H04L 27/2607* (2013.01); *H04L 5/0048* (2013.01); *H04L 27/2613* (2013.01)

(58) Field of Classification Search
None
See application file for complete search history.

(56) References Cited

U.S. PATENT DOCUMENTS

| | | | |
|---|---|---|---|
| 6,956,812 B2 * | 10/2005 | Okada | H04L 27/2666 370/208 |
| 9,954,704 B2 * | 4/2018 | Atungsiri | H04L 27/2602 |
| 10,404,509 B2 | 9/2019 | Sun et al. | |
| 10,461,979 B2 | 10/2019 | Pawar et al. | |
| 11,088,799 B2 | 8/2021 | Sun et al. | |
| 2020/0067748 A1 | 2/2020 | Zhang et al. | |
| 2021/0328743 A1 | 10/2021 | Sun et al. | |
| 2022/0417935 A1 * | 12/2022 | Sakhnini | H04L 5/0044 |

(Continued)

FOREIGN PATENT DOCUMENTS

| | | | | |
|---|---|---|---|---|
| EP | 1968223 A1 * | 9/2008 | ......... | H04L 27/2607 |
| EP | 1971058 A1 * | 9/2008 | .......... | H04J 11/0083 |

(Continued)

OTHER PUBLICATIONS

International Search Report and Written Opinion—PCT/US2023/063940—ISA/EPO—May 26, 2023.

*Primary Examiner* — Anh Vu H Ly

(57) ABSTRACT

Certain aspects of the present disclosure provide techniques for time division multiplexing (TDMing) user equipment (UE) data using guard interval (GI)-based waveforms. An example method generally includes communicating with a device using a frame format, the frame format comprising a first symbol, a second symbol, and a third symbol, wherein: the first symbol comprises a first data portion for a first UE and a first GI corresponding to the first UE; the third symbol comprises a second data portion for a second UE and a second GI corresponding to the second UE, wherein the third symbol is later in time than the first symbol; and the second symbol comprises a gap or a reference signal (RS), a third GI corresponding to the first UE, and a fourth GI corresponding to the second UE, wherein the second symbol is between the first and third symbol in time.

30 Claims, 19 Drawing Sheets

(56) References Cited

U.S. PATENT DOCUMENTS

| | | | |
|---|---|---|---|
| 2023/0060054 A1* | 2/2023 | Zhang | H04L 5/0094 |
| 2023/0135780 A1* | 5/2023 | Sakhnini | H04W 8/24 |
| | | | 370/329 |
| 2023/0140287 A1* | 5/2023 | Sakhnini | H04W 72/23 |
| | | | 370/336 |

FOREIGN PATENT DOCUMENTS

| | | | |
|---|---|---|---|
| WO | 2017065825 A1 | 4/2017 | |
| WO | 2017201273 A1 | 11/2017 | |
| WO | 2018017302 A1 | 1/2018 | |

* cited by examiner

700

METHOD FOR WIRELESS COMMUNICATION BY A WIRELESS NODE

710

COMMUNICATE, BY THE WIRELESS NODE, WITH A DEVICE USING A FRAME FORMAT, THE FRAME FORMAT COMPRISING A FIRST SYMBOL, A SECOND SYMBOL, AND A THIRD SYMBOL, WHEREIN:
THE FIRST SYMBOL COMPRISES A FIRST DATA PORTION FOR A FIRST USER EQUIPMENT (UE) AND A FIRST GUARD INTERVAL (GI) CORRESPONDING TO THE FIRST UE;
THE THIRD SYMBOL COMPRISES A SECOND DATA PORTION FOR A SECOND UE AND A SECOND GI CORRESPONDING TO THE SECOND UE, WHEREIN THE THIRD SYMBOL IS LATER IN TIME THAN THE FIRST SYMBOL; AND
THE SECOND SYMBOL COMPRISES A GAP OR A DEMODULATION REFERENCE SIGNAL (DMRS), A THIRD GI CORRESPONDING TO THE FIRST UE, AND A FOURTH GI CORRESPONDING TO THE SECOND UE, WHEREIN THE SECOND SYMBOL IS BETWEEN THE FIRST AND THIRD SYMBOL IN TIME

FIG. 7

1100 

METHOD FOR WIRELESS COMMUNICATION BY A WIRELESS NODE

1110

COMMUNICATE, BY THE WIRELESS NODE, WITH A DEVICE USING A FRAME FORMAT, THE FRAME FORMAT COMPRISING A FIRST SYMBOL, ONE OR MORE SECOND SYMBOLS, AND A THIRD SYMBOL, WHEREIN: THE FIRST SYMBOL COMPRISES A FIRST DATA PORTION FOR A FIRST USER EQUIPMENT (UE) AND A FIRST GUARD INTERVAL (GI) CORRESPONDING TO THE FIRST UE;
THE THIRD SYMBOL COMPRISES A SECOND DATA PORTION FOR A SECOND UE AND A SECOND GI CORRESPONDING TO THE SECOND UE, WHEREIN THE THIRD SYMBOL IS LATER IN TIME THAN THE FIRST SYMBOL; AND
THE ONE OR MORE SECOND SYMBOLS COMPRISE A GAP OR A DEMODULATION REFERENCE SIGNAL (DMRS) AND A THIRD GI CORRESPONDING TO THE SECOND UE, WHEREIN THE ONE OR MORE SECOND SYMBOLS ARE BETWEEN THE FIRST AND THIRD SYMBOL IN TIME

METHOD FOR WIRELESS COMMUNICATION BY A WIRELESS NODE

1310

COMMUNICATE, BY THE WIRELESS NODE, WITH A DEVICE USING A FRAME FORMAT, THE FRAME FORMAT COMPRISING:
A FIRST SYMBOL COMPRISING A FIRST DATA PORTION FOR A FIRST USER EQUIPMENT (UE) AND A FIRST GUARD INTERVAL (GI) CORRESPONDING TO THE FIRST UE OR A SECOND UE, WHEREIN THE FIRST DATA PORTION IS EARLIER IN TIME THAN THE FIRST GI;
A SECOND SYMBOL LATER IN TIME AND ADJACENT IN TIME TO THE FIRST SYMBOL, THE SECOND SYMBOL COMPRISING A SECOND DATA PORTION FOR THE SECOND UE AND A SECOND GI CORRESPONDING TO THE SECOND UE, WHEREIN THE SECOND DATA PORTION IS EARLIER IN TIME THAN THE SECOND GI;
A FIRST GAP IN TIME BETWEEN THE FIRST DATA PORTION AND THE FIRST GI IN THE FIRST SYMBOL; AND
A SECOND GAP EARLIER IN TIME THAN THE SECOND DATA PORTION IN THE SECOND SYMBOL

*FIG. 13*

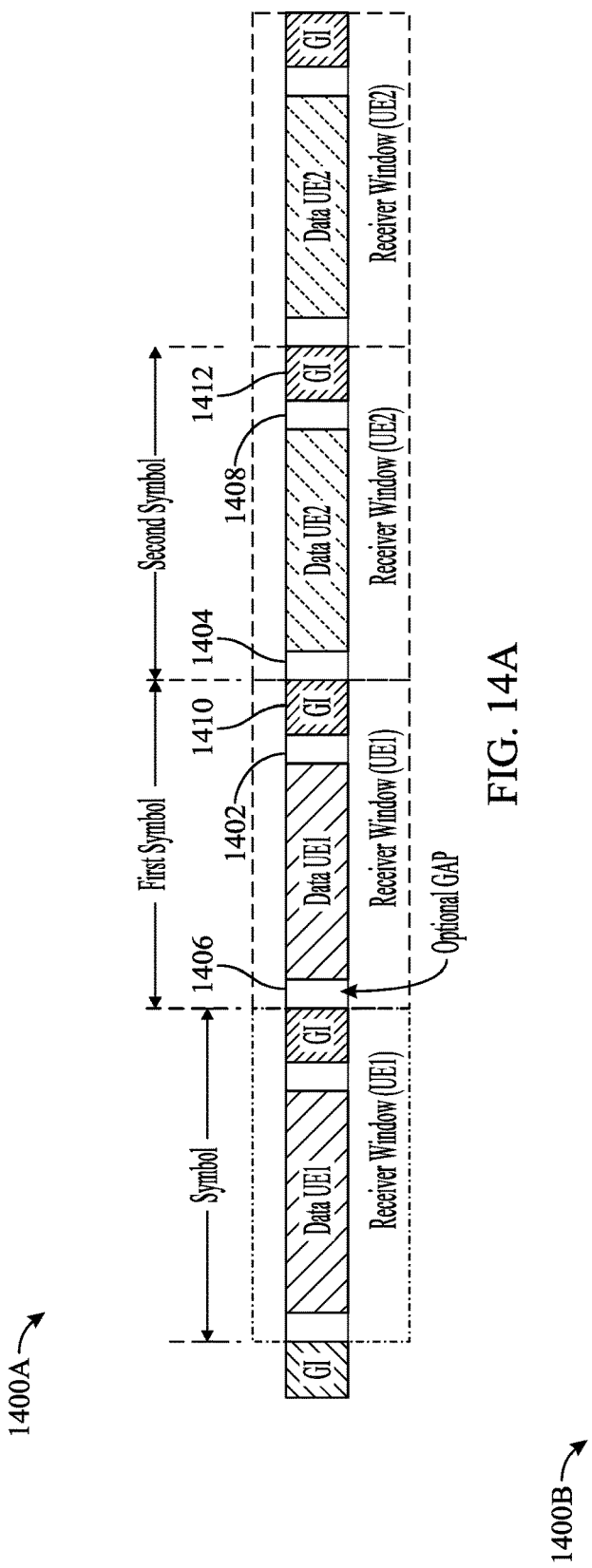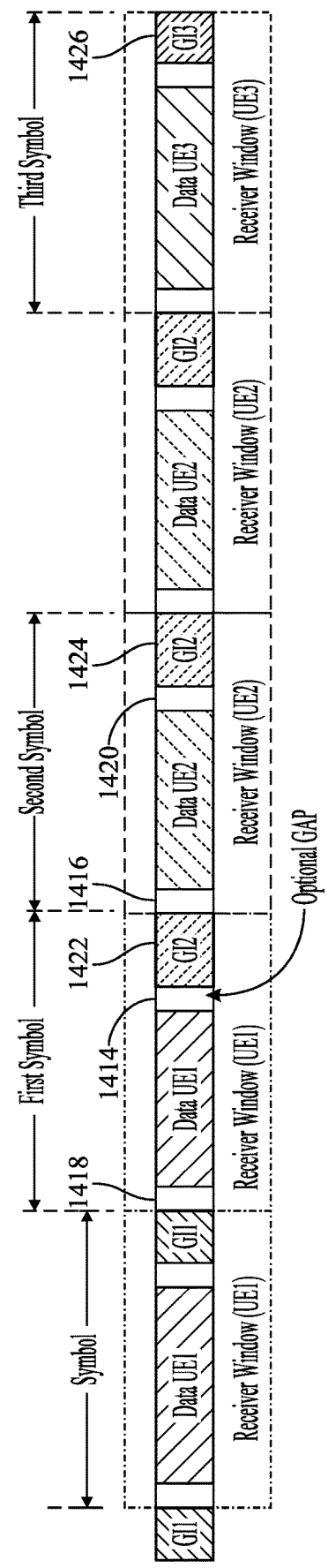
FIG. 14A
FIG. 14B

1500

METHOD FOR WIRELESS COMMUNICATION BY A WIRELESS NODE

1510

COMMUNICATE, BY THE WIRELESS NODE, WITH A DEVICE USING A FRAME FORMAT, THE FRAME FORMAT COMPRISING:
A FIRST SYMBOL COMPRISING A FIRST DATA PORTION FOR A FIRST USE EQUIPMENT (UE) AND A FIRST GUARD INTERVAL (GI) CORRESPONDING TO THE FIRST UE, WHEREIN THE FIRST DATA PORTION IS EARLIER IN TIME THAN THE FIRST GI;
A SECOND SYMBOL LATER IN TIME AND ADJACENT IN TIME TO THE FIRST SYMBOL, THE SECOND SYMBOL COMPRISING A SECOND DATA PORTION FOR A SECOND UE AND A SECOND GI CORRESPONDING TO THE SECOND UE, WHEREIN THE SECOND DATA PORTION IS EARLIER IN TIME THAN THE SECOND GI, WHEREIN A LENGTH OF THE FIRST GI IS EQUAL TO A LENGTH OF THE SECOND GI; AND
AT LEAST ONE OF:
A FIRST GAP IN TIME BETWEEN THE FIRST DATA PORTION AND THE FIRST GI IN THE FIRST SYMBOL; OR
A SECOND GAP IN TIME BETWEEN THE FIRST GI AND THE SECOND DATA PORTION IN THE SECOND SYMBOL.

METHOD FOR WIRELESS COMMUNICATION BY A WIRELESS NODE

1710

COMMUNICATE, BY THE WIRELESS NDOE, USING A FRAME FORMAT, THE FRAME FORMAT COMPRISING:
A FIRST SYMBOL COMPRISING A FIRST DATA PORTION FOR A FIRST USER EQUIPMENT (UE) AND A FIRST GUARD INTERVAL (GI) CORRESPONDING TO THE FIRST UE, WHEREIN THE FIRST GI IS AT LEAST ONE OF:
LATER IN TIME THAN THE FIRST DATA PORTION; OR
EARLIER IN TIME THAN THE FIRST DATA PORTION;
A SECOND SYMBOL LATER IN TIME AND ADJACENT IN TIME TO THE FIRST SYMBOL, THE SECOND SYMBOL COMPRISING A SECOND DATA PORTION FOR A SECOND UE; AND
A SECOND GI CORRESPONDING TO THE SECOND UE, WHEREIN THE SECOND GI IS AT LEAST ONE OF:
WHEN THE FIRST GI IS LATER IN TIME THAN THE FIRST DATA PORTION, PART OF THE SECOND SYMBOL AND EARLIER IN TIME THAN THE SECOND DATA PORTION OF THE SECOND SYMBOL; OR
WHEN THE FIRST GI IS EARLIER IN TIME THAN THE FIRST DATA PORTION, PART OF THE FIRST SYMBOL AND LATER IN TIME THAN THE FIRST DATA PORTION OF THE FIRST SYMBOL

FIG. 17

TIME DIVISION MULTIPLEXED USER EQUIPMENT (UE) DATA FOR GUARD INTERVAL (GI)-BASED WAVEFORMS

INTRODUCTION

Aspects of the present disclosure relate to wireless communications, and more particularly, to techniques for supporting guard interval (GI)-based waveforms.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communications by a wireless node. The method generally includes communicating with a device using a frame format, the frame format comprising a first symbol, a second symbol, and a third symbol, wherein: the first symbol comprises a first data portion for a first user equipment (UE) and a first guard interval (GI) corresponding to the first UE; the third symbol comprises a second data portion for a second UE and a second GI corresponding to the second UE, wherein the third symbol is later in time than the first symbol; and the second symbol comprises a gap or a reference signal (RS), a third GI corresponding to the first UE, and a fourth GI corresponding to the second UE, wherein the second symbol is between the first and third symbol in time.

One aspect provides another method for wireless communications by a wireless node. The method generally includes communicating with a device using a frame format, the frame format comprising a first symbol, one or more second symbols, and a third symbol, wherein: the first symbol comprises a first data portion for a first UE and a first GI corresponding to the first UE; the third symbol comprises a second data portion for a second UE and a second GI corresponding to the second UE, wherein the third symbol is later in time than the first symbol; and the one or more second symbols comprises a gap or an RS and a third GI corresponding to the first UE, wherein the one or more second symbols are between the first and third symbol in time.

One aspect provides another method for wireless communications by a wireless node. The method generally includes communicating with a device using a frame format, the frame format comprising: a first symbol comprising a first data portion for a first UE and a first GI corresponding to the first UE or a second UE, wherein the first data portion is earlier in time than the first GI; a second symbol later in time and adjacent in time to the first symbol, the second symbol comprising a second data portion for the second UE and a second GI corresponding to the second UE, wherein the second data portion is earlier in time than the second GI; a first gap in time between the first data portion and the first GI in the first symbol; and a second gap earlier in time than the second data portion in the second symbol.

One aspect provides another method for wireless communications by a wireless node. The method generally includes communicating with a device using a frame format, the frame format comprising: a first symbol comprising a first data portion for a first UE and a first GI corresponding to the first UE, wherein the first data portion is earlier in time than the first GI; a second symbol later in time and adjacent in time to the first symbol, the second symbol comprising a second data portion for a second UE and a second GI corresponding to the second UE, wherein the second data portion is earlier in time than the second GI, wherein a length of the first GI is equal to a length of the second GI; and at least one of: a first gap in time between the first data portion and the first GI in the first symbol; or a second gap in time between the first GI and the second data portion in the second symbol.

One aspect provides another method for wireless communications by a wireless node. The method generally includes communicating using a frame format, the frame format comprising: a first symbol comprising a first data portion for a first UE and a first GI corresponding to the first UE, wherein the first GI is at least one of: later in time than the first data portion; or earlier in time than the first data portion; a second symbol later in time and adjacent in time to the first symbol, the second symbol comprising a second data portion for a second UE; and a second GI corresponding to the second UE, wherein the second GI is at least one of: when the first GI is later in time than the first data portion, part of the second symbol and earlier in time than the second data portion of the second symbol; or when the first GI is earlier in time than the first data portion, part of the first symbol and later in time than the first data portion of the first symbol.

Other aspects provide: an apparatus operable, configured, or otherwise adapted to perform any one of the aforementioned methods or any of those described elsewhere herein; a non-transitory, computer-readable media comprising instructions that, when executed by one or more processors of an apparatus, cause the apparatus to perform any one of the aforementioned methods or any of those described elsewhere herein; a computer program product embodied on a computer-readable storage medium comprising code for performing any one of the aforementioned methods or any of those described elsewhere herein; a computer program comprising code for performing any one of the aforementioned methods or any of those described elsewhere herein; and an apparatus comprising means for performing any one of the aforementioned methods or any of those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIG. 7 is a flow diagram illustrating example operations for wireless communication by a wireless node using a first frame format having gaps and/or reference signals (RSs) between data symbols for different UEs having at least one of different GIs, precoders, or beams, in accordance with certain aspects of the present disclosure.

FIG. 11 is a flow diagram illustrating example operations for wireless communication by a wireless node using a second frame format having gaps and/or RSs between data symbols for different UEs having at least one of different GIs, precoders, or beams, in accordance with certain aspects of the present disclosure.

FIG. 13 is a flow diagram illustrating example operations for wireless communication by a wireless node using a frame format having gaps before and after each GI of each data symbol in the frame format, in accordance with certain aspects of the present disclosure.

FIGS. 14A and 14B illustrate example frame formats having gaps before and after each GI of each data symbol in the frame format, in accordance with certain aspects of the present disclosure.

FIG. 15 is a flow diagram illustrating example operations for wireless communication by a wireless node using a frame format having gaps to account for additional delay spread of the multiple UEs while keeping GIs used in the frame format constant, in accordance with certain aspects of the present disclosure.

FIG. 17 is a flow diagram illustrating example operations for wireless communication by a wireless node using a frame format having additional GIs, in accordance with certain aspects of the present disclosure.

DETAILED DESCRIPTION

Aspects of the present disclosure provide apparatuses, methods, processing systems, computer programs, and computer-readable mediums for supporting guard interval (GI)-based waveforms. In particular, in some cases, a frame format for a GI-based waveform may include time division multiplexed (TDMed) data for multiple user equipments (UEs). To TDM data for multiple UEs in a single signal, GIs for the multiple UEs may be used as guard periods, where the GIs for the multiple UEs are different to account for different delay spreads of each of the UEs. In particular, a GI may be a fixed sequence at an end of a data symbol and may be flexibly adapted to effective channel delay spreads caused by different beamforming techniques without changing a symbol duration.

One challenge of GI-based waveforms is the necessity to include a GI sequence before and after every data symbol to achieve circular convolution. More specifically, for data transmission, data symbols are to start with one GI sequence and end with an additional GI sequence. Accordingly, achieving circular convolution may be a problem where symbols having data and GIs for multiple UEs are appended together. In particular, the head GI sequence and tail GI sequence of a data symbol may be different, thereby not achieving circular convolution. Further, such GIs may overlap with data and/or GIs of an adjacent symbol.

Accordingly, aspects of the present disclosure provide various techniques for using a frame format that allows multiple different UEs to communicate on an uplink (UL) or downlink (DL) channel with a network entity (e.g., a base station (BS)) using GIs between symbols and accounting for differences in propagation delay of the UEs with the network entity. The techniques described herein also take into consideration the different precoders and/or beams of the different UEs transmitting and/or receiving data in the frame.

Introduction to Wireless Communication Networks

Figure 1:
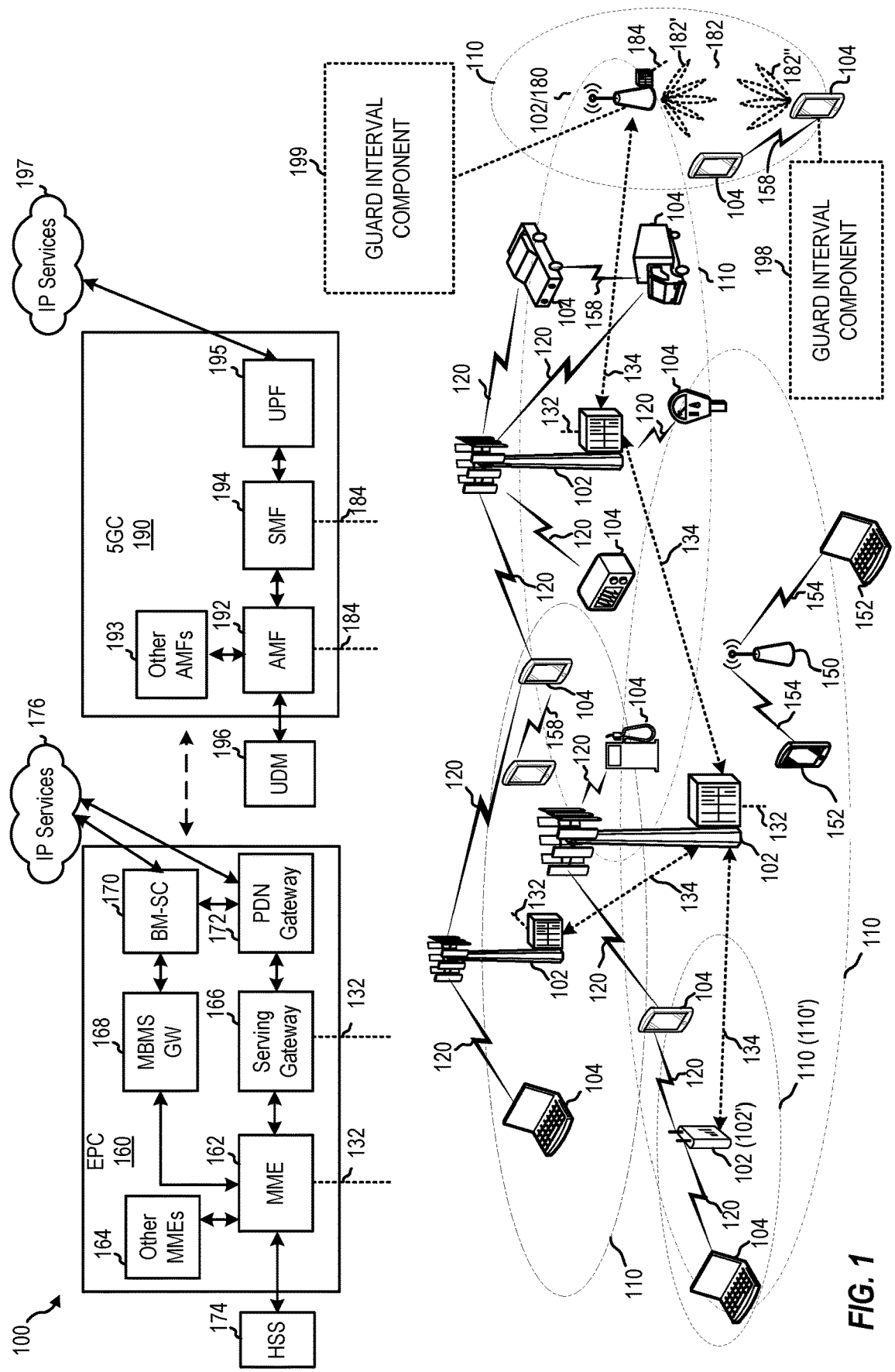
FIG. 1 is a block diagram conceptually illustrating an example wireless communication network, in accordance with certain aspects of the present disclosure.

FIG. 1 depicts an example of a wireless communication network 100, in which aspects described herein may be implemented.

Generally, wireless communication network 100 includes base stations (BSs) 102, user equipments (UEs) 104, one or more core networks, such as an Evolved Packet Core (EPC)

160 and 5G Core (5GC) network 190, which interoperate to provide wireless communications services.

BSs 102 may provide an access point to the EPC 160 and/or 5GC 190 for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, cNB, ng-cNB (e.g., an eNB that has been enhanced to provide connection to both EPC 160 and 5GC 190), an access point, a base transceiver station, a radio base station, a radio transceiver, or a transceiver function, or a transmission reception point in various contexts.

A BS, such as BS 102, may include components that are located at a single physical location or components located at various physical locations. In examples in which the base station includes components that are located at various physical locations, the various components may each perform various functions such that, collectively, the various components achieve functionality that is similar to a base station that is located at a single physical location. As such, a base station may equivalently refer to a standalone base station or a base station including components that are located at various physical locations or virtualized locations. In some implementations, a base station including components that are located at various physical locations may be referred to as or may be associated with a disaggregated radio access network (RAN) architecture, such as an Open RAN (O-RAN) or Virtualized RAN (VRAN) architecture. In some implementations, such components of a base station may include or refer to one or more of a central unit (CU), a distributed unit (DU), or a radio unit (RU).

BSs 102 wirelessly communicate with UEs 104 via communications links 120. Each of BSs 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IOT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming.

In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communication network 100 includes Guard Interval Component 199, which may be configured to communicate according to a frame format that allows multiple different UEs to communicate on an uplink (UL) or downlink (DL) channel with a network entity using a GI between symbols. Wireless communication network 100 further includes Guard Interval Component 198, which may be used configured to communicate according to a frame format that allows multiple different UEs to communicate on a UL or DL channel with a network entity using a GI between symbols.

Figure 2:
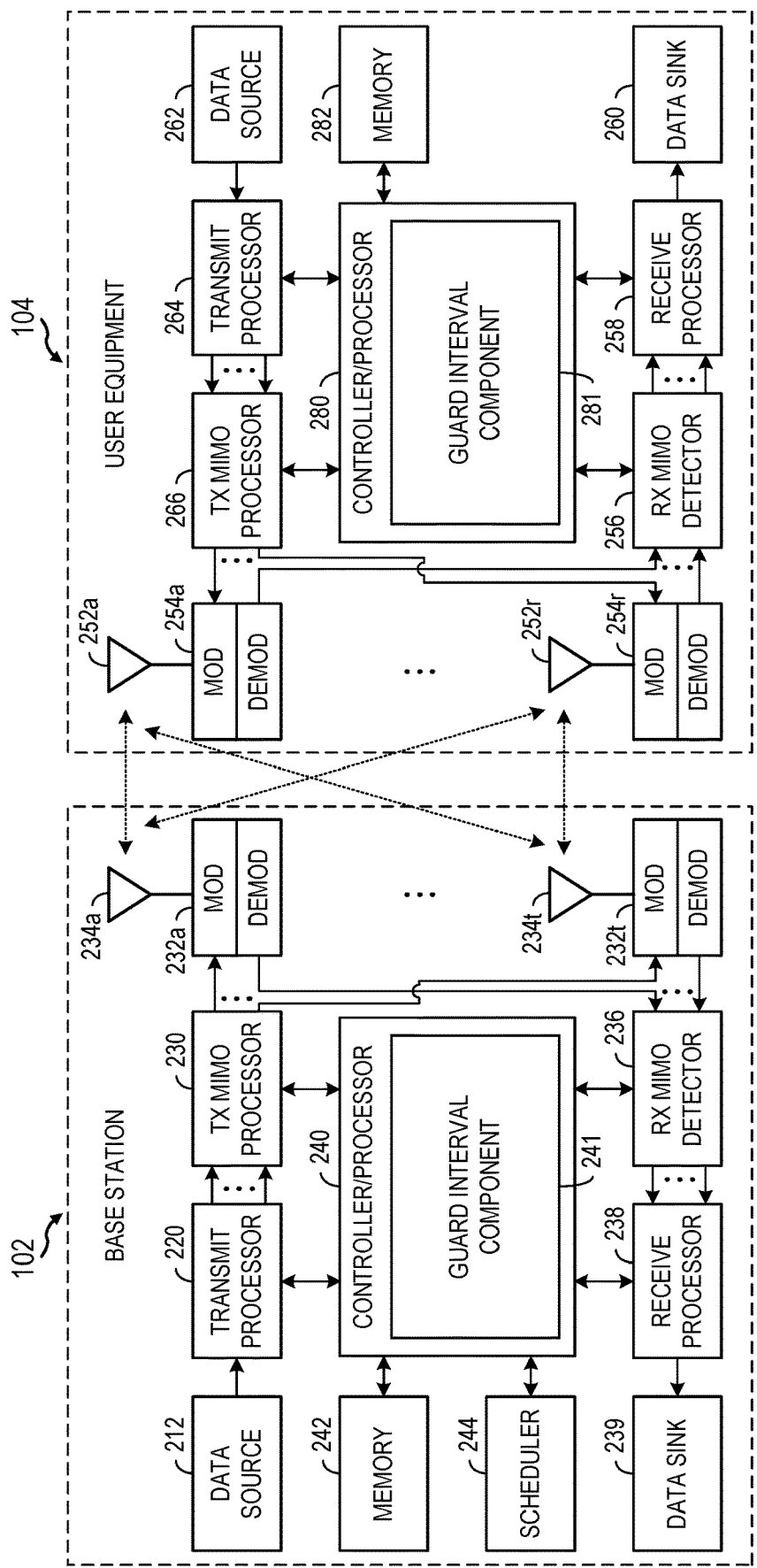
FIG. 2 is a block diagram conceptually illustrating aspects of an example of a base station (BS) and an example user equipment (UE), in accordance with certain aspects of the present disclosure.

FIG. 2 depicts aspects of an example BS 102 and a UE 104. Generally, BS 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, BS 102 may send and receive data between itself and UE 104.

BS 102 includes controller/processor 240, which may be configured to implement various functions related to wireless communications. In the depicted example, controller/processor 240 includes Guard Interval Component 241, which may be representative of Guard Interval Component 199 of FIG. 1. Notably, while depicted as an aspect of controller/processor 240, Guard Interval Component 241 may be implemented additionally or alternatively in various other aspects of BS 102 in other implementations.

Generally, UE 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

UE 104 includes controller/processor 280, which may be configured to implement various functions related to wireless communications. In the depicted example, controller/ processor 280 includes Guard Interval Component 281, which may be representative of Guard Interval Component 198 of FIG. 1. Notably, while depicted as an aspect of controller/processor 280, Guard Interval Component 281 may be implemented additionally or alternatively in various other aspects of UE 104 in other implementations.

Figure 3:
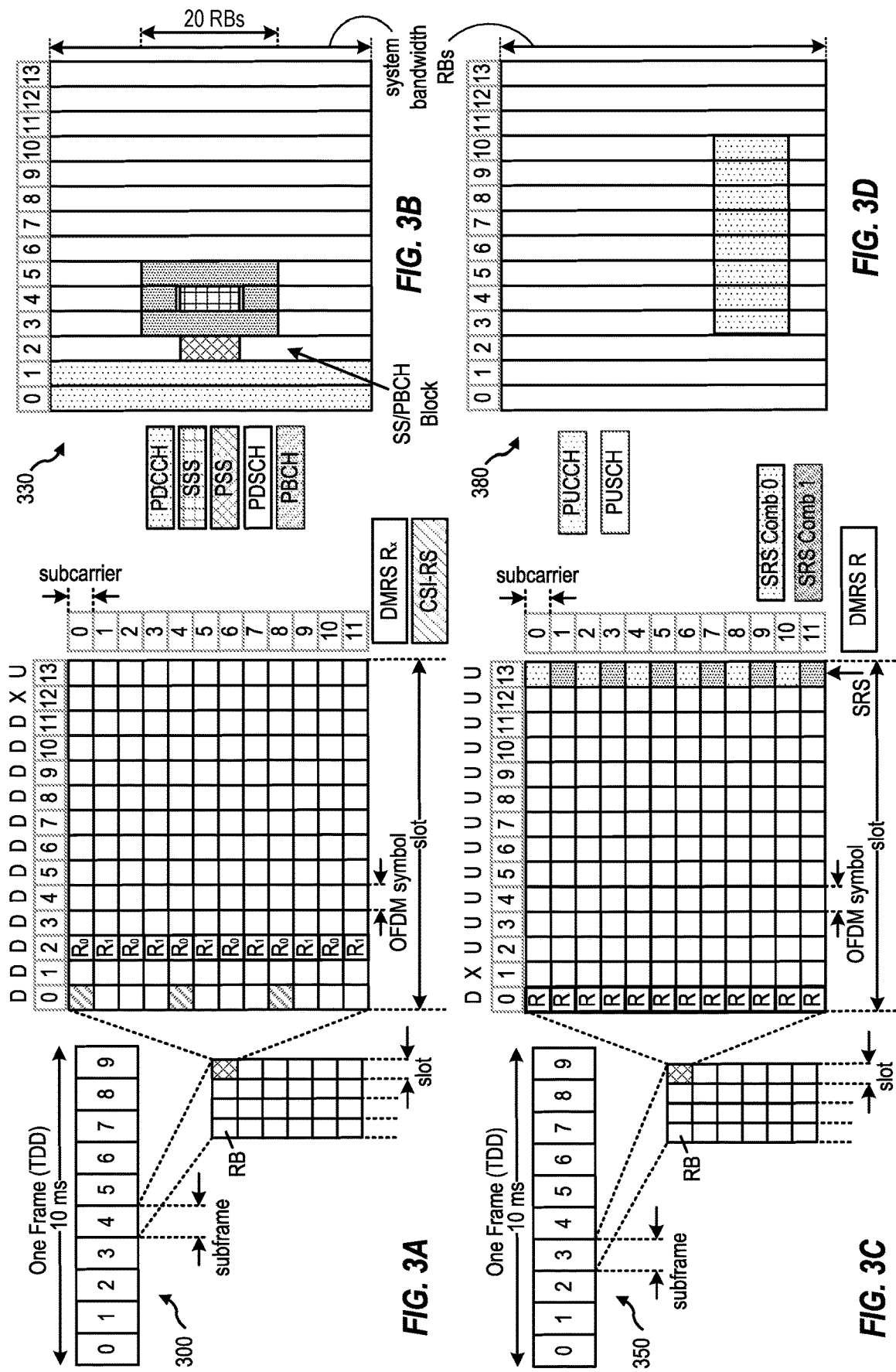
FIGS. 3A, 3B, 3C, and 3D depict various example aspects of data structures for a wireless communication network, in accordance with certain aspects of the present disclosure.

FIGS. 3A, 3B, 3C, and 3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A, 3B, 3C, and 3D are provided later in this disclosure.

Introduction to Millimeter Wave (mmWave) Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

5G networks may utilize several frequency ranges, which in some cases are defined by a standard, such as the 3GPP standards. For example, 3GPP technical standard (TS) 38.101 currently defines Frequency Range 1 (FR1) as including 600 megahertz (MHz)-6 gigahertz (GHz), though specific uplink (UL) and downlink (DL) allocations may fall outside of this general range. Thus, FR1 is often referred to (interchangeably) as a "Sub-6 GHz" band.

Similarly, TS 38.101 currently defines Frequency Range 2 (FR2) as including 26-41 GHz, though again specific uplink and downlink allocations may fall outside of this general range. FR2, is sometimes referred to (interchangeably) as a "millimeter wave" ("mmW" or "mmWave") band, despite being different from the extremely high frequency (EHF) band (30 GHz-300 GHz) that is identified by the International Telecommunications Union (ITU) as a "millimeter wave" band because wavelengths at these frequencies are between 1 millimeter and 10 millimeters.

Communications using mmWave/near mmWave radio frequency band (e.g., 3 GHz-300 GHz) may have higher path loss and a shorter range compared to lower frequency communications. As described above with respect to FIG. 1, a BS (e.g., BS 180) configured to communicate using mmWave/near mmWave radio frequency bands may utilize beamforming (e.g., 182) with a UE (e.g., UE 104) to improve path loss and range.

Example Waveforms for Operation in Higher Bands

Operation in the higher bands, such as Frequency Range 2 (FR2) and beyond (e.g., bands greater than 52.6 gigahertz (GHz)) may allow for communications with larger bandwidth and higher throughput. Operations in the higher band may, however, suffer from one or more impairments. In one example, operations in the higher bands may experience a higher phase noise (PN). In another example, operations in the higher bands may target a lower peak-to-average power ratio (PAPR). In yet another example, operations in the higher bands may lead to increased receiver complexity.

PN is a random local oscillator (LO) frequency offset causing mismatch between the LO of transmitter and the LO of the receiver. At higher carrier frequencies (higher bands), PN increases. PN robustness may also depend on whether coherent or non-coherent modulation is used. An example coherent modulation scheme is quadrature amplitude modulation (QAM). Examples of non-coherent modulation schemes includes phase shift keying (PSK), differential phase shift keying (DPSK), frequency shift keying (FSK), and amplitude shift keying (ASK).

Non-coherent modulation schemes may be generally more robust to PN errors and, therefore, estimation of carrier PN may not be done. Coherent modulation schemes may be generally less robust to PN. Non-coherent modulation schemes, however, may exhibit higher block error rates (BER) than coherent modulation schemes and may only occur under low/medium PN assumptions. At high PN and signal to noise ratios (SNR), non-coherent modulation schemes may outperform coherent schemes.

Receiver complexity may increase based on the type of waveform used. For example, if an orthogonal frequency division multiplex (OFDM) waveform or a Discrete Fourier transform (DFT) spread OFDM (DFT-s-OFDM) waveform is used, a larger subcarrier spacing (SCS) is used, thereby increasing receiver complexity (e.g., fast Fourier transform operation may be an issue).

A single cell time division scheme may impede the ability to perform frequency division multiplexing (FDM) and lower the bandwidth utilization and efficiency. The receiver can use a single tap frequency domain equalizer (FDE) or may use a time domain equalizer. With FDE, the receiver may use a cyclic prefix (CP) or guard interval (GI). With FDE, Fast Fourier Transform (FFT) may be used at the receiver, which increases complexity at the receiver.

In addition, at different times, the receiver may have different processing loads and, thus, may be able to handle different complexity configurations. Different loading may be due to scheduling activity, a number of configured multiple-input multiple-output (MIMO) layers, beam management, and the like.

Various waveforms may be considered, in order to address such challenges. These waveforms can include CP-OFDM, a single carrier (SC) frequency duplexed (FD) waveform such as SC-DFT-s-OFDM, and a SC time duplexed (TD) waveform such as SC-QAM.

A CP-OFDM waveform uses a CP (e.g., described in more detail below with respect to FIG. 4). CP-OFDM may have high complexity. CP-OFDM may use a single tap FDE. CP-OFDM makes efficient use of the bandwidth. FDM can be used with CP-OFDM. CP-OFDM may use an increased SCS. CP-OFDM may use a higher order MIMO scheme.

An SC FD waveform uses a CP or GI (e.g., described in more detail below with respect to FIG. 4). The SC FD waveform may have high complexity. The SC FD waveform may use a single tap FDE. The SC FD waveform makes efficient use of the bandwidth. FDM can be used with the SC FD waveform, however, PAPR may be impacted. SC FD may use an increased SCS.

A SC TD waveform uses a CP or GI. The SC TD waveform may have lower complexity than the SC FD and CP-OFDM waveforms. The SC TD waveform may use a single tap FDE or TDE. The SC TD waveform makes less efficient use of the bandwidth than the SC FD and CP-OFDM waveforms. FDM can be used with the SC FD waveform with guard bands. SC TD may perform well at lower SNRs. SC TD may use TD filtering.

CPs and GIs used by the various waveforms may help to prevent delay spread occurring in multipath propagation. In particular, multipath propagation, an inherent feature of a mobile communications channel, results in a received signal that is dispersed in time. Each path has its own delay thereby causing multiple instances of the same signal to arrive at a receiver (RX) at different times. The non-simultaneous arrivals of different instances of the signal at the RX causes a spread of the original signal in the time domain, which is referred to as the delay spread. Such delay spread can be detrimental to communication systems. Accordingly, CPs or GIs may be used to tackle the delay spread.

Figure 4:
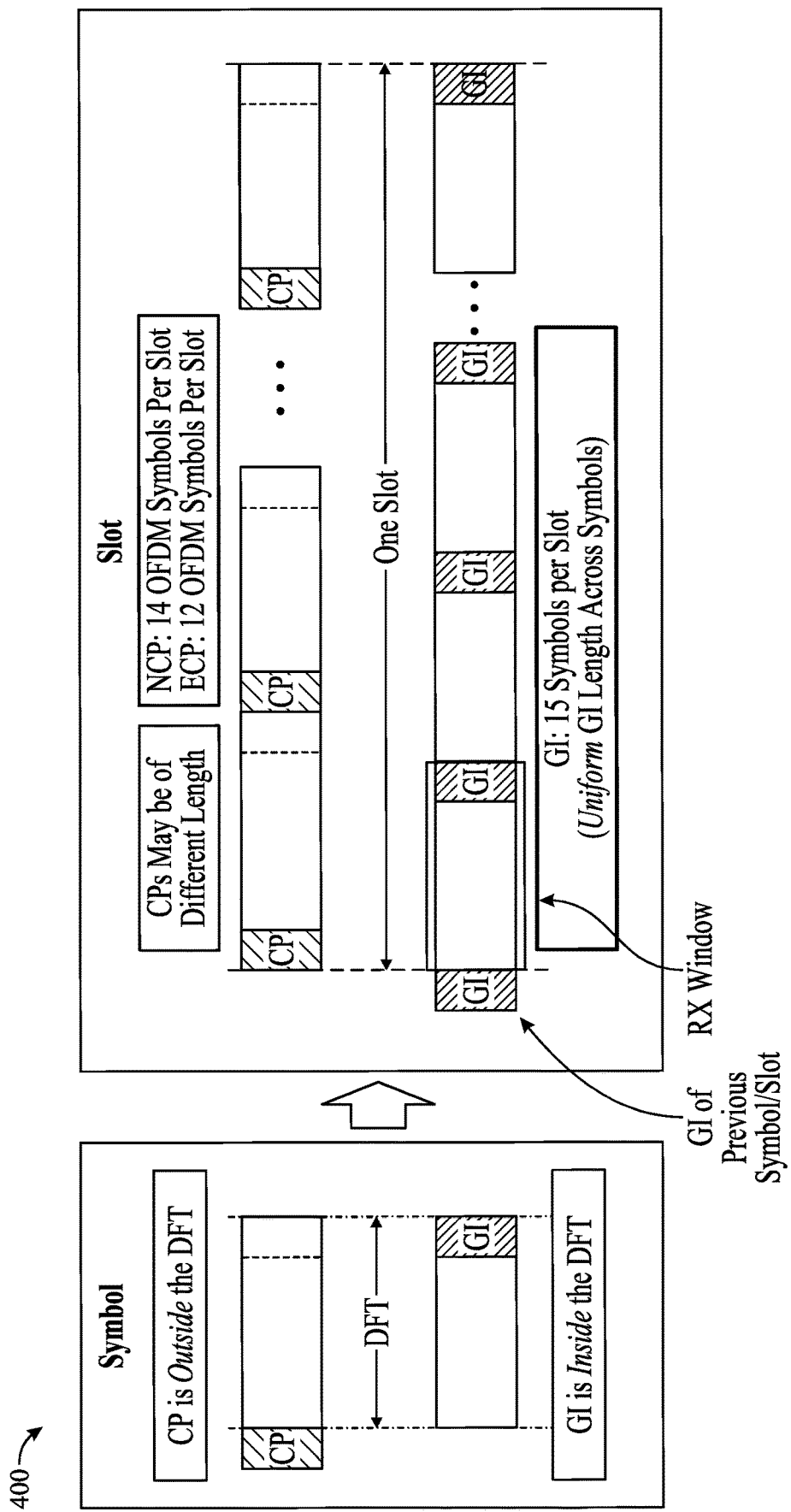
FIG. 4 illustrates an example slot having cyclic prefixes (CPs) or guard intervals (GIs) between symbols, in accordance with certain aspects of the present disclosure.

FIG. 4 illustrates an example slot 400 having CPs or GIs between symbols, in accordance with certain aspects of the present disclosure.

As illustrated in FIG. 4, a CP may be slot-contained. CPs may have different durations (interchangeably referred to herein as "lengths"). For example, a "normal" CP (NCP) length may be used for slots that have 14 OFDM symbols, while an extended CP (ECP) length may be used for slots that have 12 OFDM symbols. The length of the CP is pre-determined and is set according to channel delay spread characteristics or to fit a certain frame duration; thus, the CP is not easily adaptable to variable delay spreads.

Figure 5:
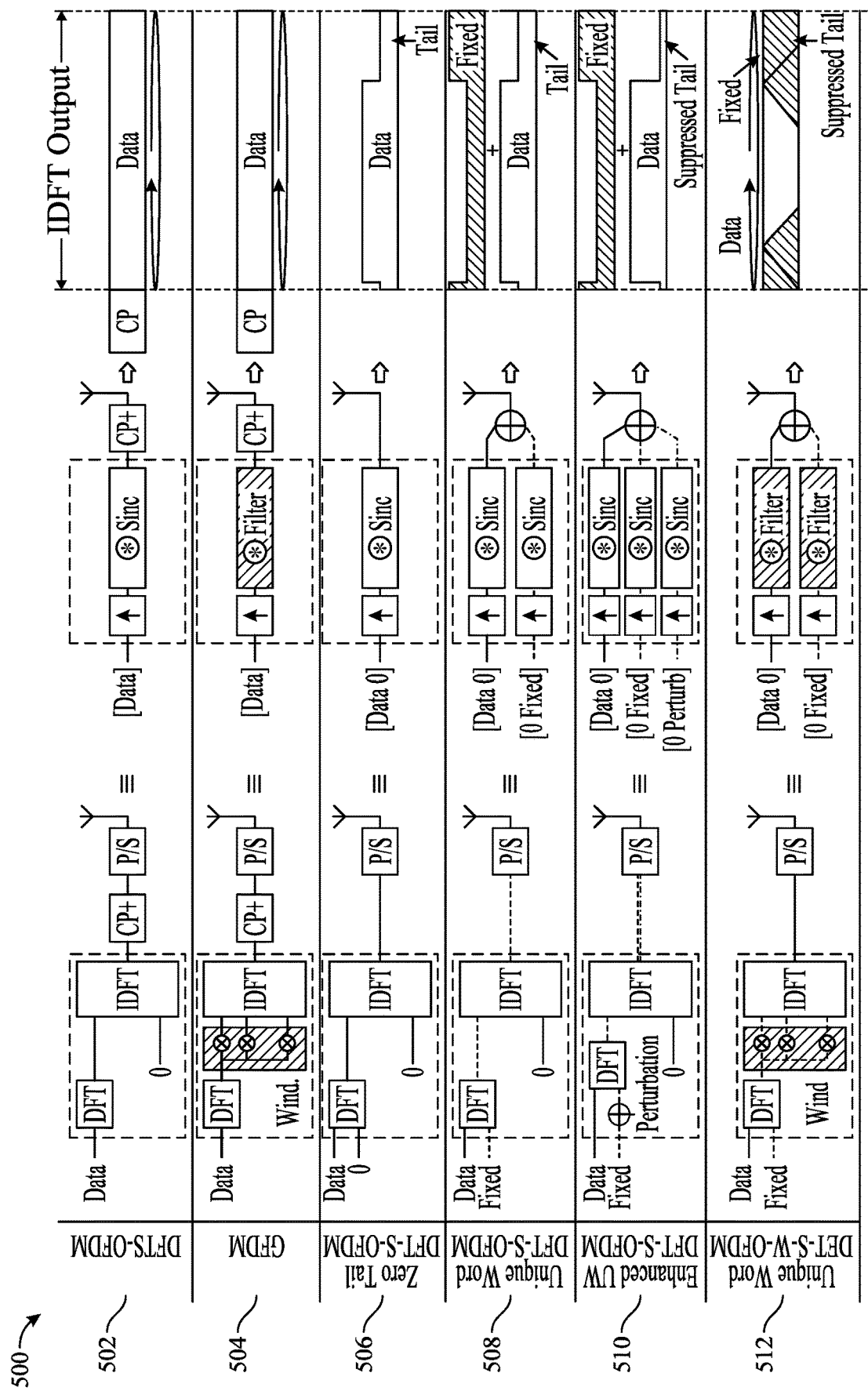
FIG. 5 depicts a comparison of Discrete Fourier Transform-spread-orthogonal frequency division multiplex (DFT-S-OFDM)-based waveforms and illustration of the resulting signals in time domain, in accordance with certain aspects of the present disclosure.

Further, as illustrated in FIG. 4, a CP typically falls outside of a DFT. This is further illustrated in FIG. 5, where a CP is implemented after the inverse DFT (IDFT). In FIG. 5, only the data undergoes a DFT, and subsequent IDFT. The CP is added after the IDFT and the combination of data and CP is transmitted. As a result, it may be difficult to change the length of the CP.

OFDM/DFT-s-OFDM based systems (for e.g., LTE, WiFi, etc.) may tackle delay spread by adding a CP before the start of the symbol. This CP preserves the orthogonality of the subcarriers and prevents inter-symbol interference (ISI) between successive symbols. However, the CP does not carry any useful data (e.g., the CP includes random data, the random data itself having minimal function).

A GI is an alternative to using a CP. As illustrated in FIG. 4, while a CP is slot-contained, a GI is not slot-contained. In particular, while repeating GIs may serve to mitigate ISI, each symbol may depend on the GI of a previous symbol to provide ISI mitigation instead of being independent or slot-contained in terms of ISI mitigation in the CP-based symbol. For example, the first symbol in the slot illustrated in FIG. 4 depends on the GI of a previous symbol/slot. Further, a GI falls within the DFT. This allows a transmitter to change the GI length adaptively for any DFT length.

Like a CP, a GI may help to minimize symbol overlap and enable linear to circular convolution conversion. Unlike a CP, a GI may be either a series of zeros (e.g., a Zero Tail (ZT) configuration (e.g., a series of zeroes at the tail or end of a symbol) or a Zero Head (ZH) configuration (e.g., a series of zeroes at the head or beginning of a symbol) or a known sequence (e.g., a Unique Word (UW) configuration where the sequence is a deterministic sequence of bits). Because a GI may be a known sequence, the GI may be utilized for a purpose, such as synchronization, channel estimation, the transport of information, and/or phase tracking, thereby removing the excess overhead present when using a CP. Further, a GI may easily adapt to delay spread without changing a symbol duration. It should be noted that for a GI to be a series of zeros, an actual signal may be transmitted by a device in the GI, wherein the value encoded in the signal is a series of zeros. This differs from a gap, where no transmission occurs, meaning there is no data to decode and no value communicated.

FIG. 5 depicts a comparison 500 of DFT-s-OFDM-based waveforms and schematic illustration of the resulting signals in time domain, in accordance with certain aspects of the present disclosure. As mentioned, DFT-s-OFDM, enables the synthesis of block-based single carrier waveforms with various bandwidths by changing the size of the DFT-spread block. Conceptually, it also allows a transition between block-based multicarrier and single-carrier schemes when multiple DFT-spread blocks are employed in the structure. DFT-S-OFDM can also accommodate an internal guard period that offers flexibility on the duration of the guard periods without affecting the symbol duration. As shown in FIG. 5, the guard period may be either a CP or GI.

In particular, as illustrated at 502, a CP may be implemented after the IDFT for a DFT-s-OFDM-based waveform. As mentioned, only data undergoes a DFT, and subsequent IDFT. The CP is added after the IDFT and the combination of data. As a result, it is typically difficult to (dynamically) change the length of a CP.

Further, as illustrated at 504, a CP may be implemented for GFDM. GFDM can be viewed as an extension of DFT-s-OFDM. GFDM is based on the circular convolution of the up-sampled data symbols with a configuration prototype filter, which DFT-s-OFDM performs the same operation with Dirichel sinc function.

On the other hand, 506-512, illustrate use of a GI for the guard period, as opposed to a CP as illustrated at 502 and 504. As mentioned, a GI may be a series of zeros or a known sequence. In particular, 506 illustrates a ZT GI implementation (e.g., a GI containing a series of zeros) for a DFT-s-OFDM waveform while 508-512 illustrate a UW GI implementation (e.g., a GI containing a known sequence) for DFT-s-OFDM waveforms.

Figure 6:
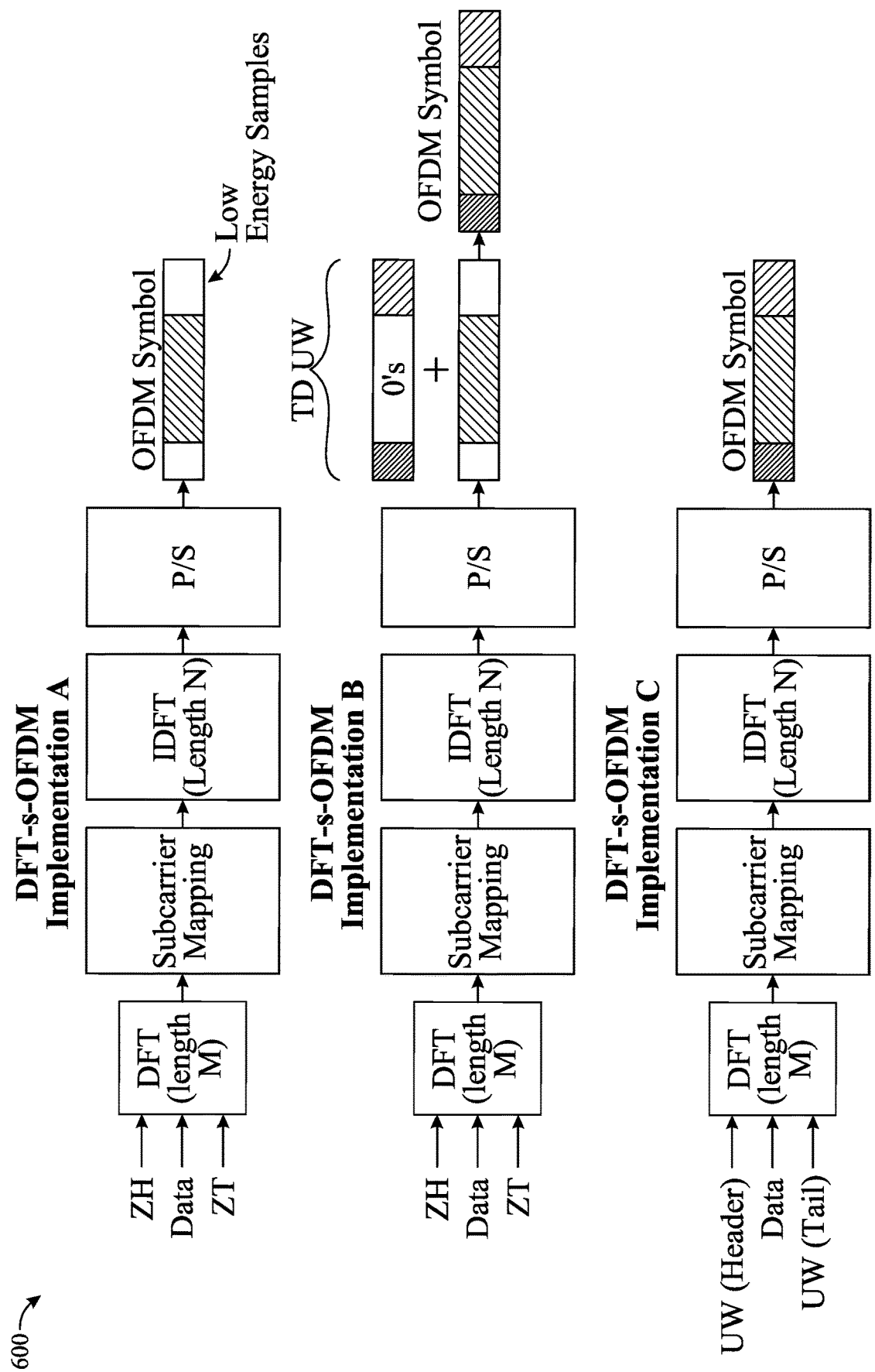
FIG. 6 illustrates the formation of OFDM symbols with at least a zero tail (ZT) GI, a zero head (ZH) GI, or a unique word (UW) GI for comparison, in accordance with certain aspects of the present disclosure.

FIG. 6 illustrates the formation 600 of OFDM symbols with at least a ZT GI, a ZH GI, or a UW GI for comparison, in accordance with certain aspects of the present disclosure. As illustrated in FIG. 6, for DFT-s-OFDM Implementation A, zeros are appended at the end (e.g., ZT GI) and at the beginning (e.g., ZH GI) of the modulation symbol. In particular, prior to precoding (e.g., before the DFT), GIs each containing a series of zeroes are inserted at the beginning and the end of the data. After the IDFT and the parallel to serial (P/S) log, the transmitted output, the OFDM symbol, contains data, a header, and a tail. The tail corresponds to the ZT GI and the header corresponds to the ZH GI. In other words, the output OFDM symbol contains low energy samples referred to herein as GIs.

Alternatively, for DFT-s-OFDM Implementation C, a known sequence is appended at the end (e.g., UW tail GI) and at the beginning (e.g., UW header GI) of the modulation symbol. In particular, prior to precoding (e.g., before the DFT), GIs each containing a known sequence are inserted at the beginning and the end of the data. After the IDFT and the P/S log, the transmitted output, the OFDM symbol, contains data, a header, and a tail. The tail corresponds to the UW tail GI and the header corresponds to the UW header GI. While DFT-s-OFDM Implementation C illustrates the addition of the UW header and UW tail prior to the DFT, in some cases, as shown in DFT-s-OFDM Implementation B, the UW header and UW tail are added after the DFT.

Aspects Related to Time Division Multiplexed (TDMed) User Equipment (UE) Data for Guard Interval (GI)-Based Waveforms According to aspects described herein, a frame format for a Guard Interval (GI)-based waveform may include time division multiplexed (TDMed) data for multiple user equipments (UEs). TDM is a method of putting multiple data streams in a single signal by separating the signal into many segments, each segment having a short duration. To TDM data for multiple UEs in a single signal, GIs for the multiple UEs may be used as guard periods, where the GIs for the multiple UEs are different to account for different delay spreads of each of the UEs.

As described above with respect to FIG. 4, when symbols having data and GIs for multiple UEs are appended together, achieving circular convolution may be difficult given a head GI sequence (e.g., for a first UE) and a tail GI sequence (e.g., for a second UE) of a data symbol may be different. Further, such GIs may overlap with data and/or GIs of an adjacent symbol. Thus, different frame format configurations may be desired to account for differences in delay spreads (and GIs) among the different UEs having data TDMed in a GI-based waveform. Frame format configurations may also take into consideration the different precoders and/or beams of the different UEs transmitting and/or receiving data in the frame.

Accordingly, aspects of the present disclosure provide various techniques for a frame format that allows multiple different UEs to communicate on an uplink (UL) or downlink (DL) channel with a network entity (e.g., base station (BS)) using a GI between symbols and accounting for differences in propagation delay of the UEs with the network entity. A first technique described herein with respect to FIGS. 7-12 may introduce gaps and/or reference signals (RSs) between data symbols for different UEs having at least one of different GIs, precoders, or beams. A second technique described herein with respect to FIGS. 13 and 14 may introduce gaps in the frame format before and after each GI of each data symbol. A third technique described herein with respect to FIGS. 15 and 16 may introduce gaps in the frame format to account for additional delay spread of the multiple UEs while keeping GIs used in the frame format constant. A fourth technique described herein with respect to FIGS. 17 and 18 may introduce additional GIs in the frame format used for communication between the different UEs and the network entity.

FIG. 7 is a flow diagram illustrating example operations 700 for wireless communication by a wireless node using a first frame format having gaps and/or reference signals (RSs) between data symbols for different UEs having at least one of different GIs, precoders, or beams, in accordance with certain aspects of the present disclosure. In certain aspects, operations 700 may be performed by a network entity, for example, by a base station (BS), such as BS 102 in wireless communication network 100. In certain aspects, operations 700 may be performed by a user equipment (UE), for example, by UE 104 in wireless communication network 100.

Operations 700 may be implemented as software components that are executed and run on one or more processors (e.g., controller/processor 240 or controller/processor 280 of FIG. 2). Further, the transmission and reception of signals by the wireless node in operations 700 may be enabled, for example, by one or more antennas (e.g., antennas 234 or antennas 252 of FIG. 2). In certain aspects, the transmission and/or reception of signals by the wireless node may be implemented via a bus interface of one or more processors (e.g., controller/processor 240 or controller/processor 280) obtaining and/or outputting signals. As used herein, a network entity may refer to a wireless communication device in a radio access network (RAN), such as a BS, a remote radio head or antenna panel in communication with a BS, and/or a network controller, for example.

Operations 700 may begin, at block 710, by the wireless node communicating with a device using a frame format, the frame format comprising: a first symbol comprising a first data portion for a first UE and a first GI corresponding to the first UE; a third symbol comprising a second data portion for a second UE and a second GI corresponding to the second UE, wherein the third symbol is later in time than the first symbol; and a second symbol comprising a gap or a reference signal (RS) (e.g., such as a demodulation reference signal (DMRS)), a third GI corresponding to the first UE, and a fourth GI corresponding to the second UE, wherein the second symbol is between the first and third symbol in time.

Figure 8:
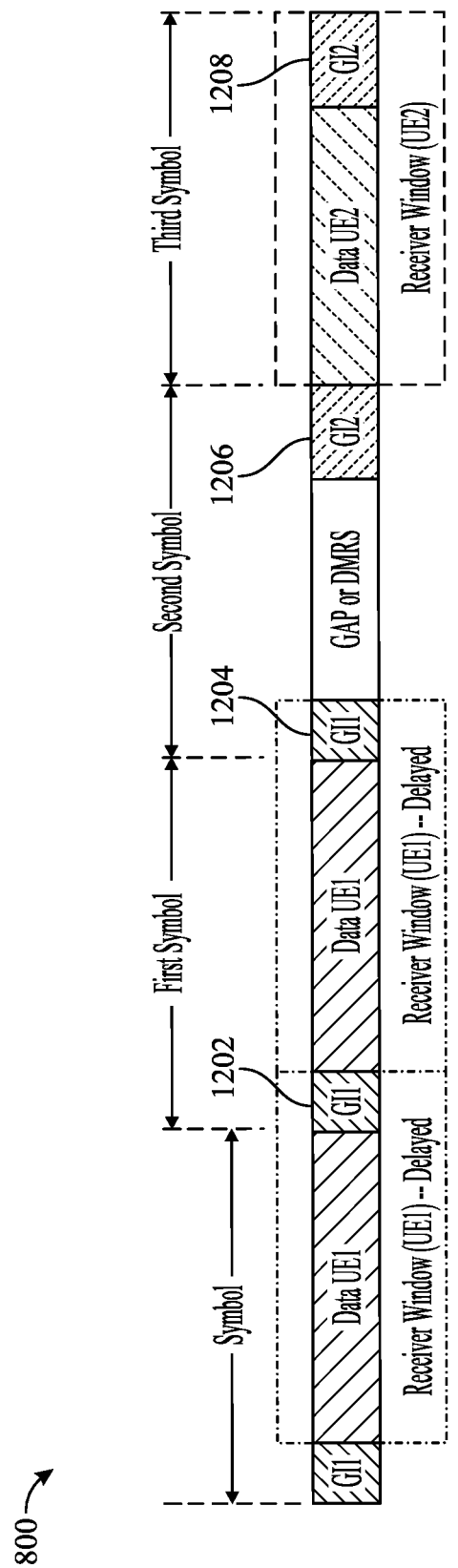
FIG. 8 illustrates an example first frame format having gaps and/or RSs between data symbols for different UEs having at least one of different GIs, precoders, or beams, in accordance with certain aspects of the present disclosure.

FIG. 8 illustrates an example first frame format 800 having gaps and/or RSs between data symbols for different UEs having at least one of different GIs, precoders, or beams, in accordance with certain aspects of the present disclosure. As shown in FIG. 8, the gap/RS symbol (e.g., the second symbol) may be situated between a first symbol carrying data for a first UE (e.g., UE1) and a third symbol carrying data for the second UE (e.g., UE2). In certain aspects, the gap/RS symbol includes an RS. The gap/RS symbol may include both a GI corresponding to the first UE (e.g., GI1 1204) and a GI corresponding to the second UE (e.g., GI2 1206). GI1 1204 in the gap/RS symbol may be earlier in time than the gap/RS. GI2 1206 in the gap/RS symbol may be later in time than the gap/RS.

Further, as shown in FIG. 8, a first symbol may include a first data portion for a first UE and a GI corresponding to the first UE (e.g., GI1 1202). GI1 1202 in the first symbol may be earlier in time than the first data portion for the first UE in the first symbol. Further, a third symbol may include a second data portion for a second UE and a GI corresponding to the second UE (e.g., GI2 1208). GI2 1208 in the third symbol may be later in time than the second data portion for the second UE in the third symbol. In certain aspects, a first channel bandwidth for the first UE is equal to a second channel bandwidth for the second UE.

GI1 1202 and GI1 1204 in the first symbol and the second symbol, respectively, may be a ZT/ZH GI or a UW GI. GI2 1206 and GI2 1208 in the second symbol and the third symbol, respectively, may be a ZT/ZH GI or a UW GI.

The gap/RS symbol may be introduced in the frame format for various reasons. In certain aspects, the gap/RS symbol is used to ensure circular convolution when a length of GI1 1202, 1204 is different than a length of GI2 1206, 1208 (e.g., length of GI1≠length of GI2). In certain aspects, the gap/RS symbol is used to ensure circular convolution when a precoder used by the first UE to communicate with a network entity is different than a precoder used by the second UE to communicate with a network entity. In certain aspects, the gap/RS symbol is used to avoid ISI between the first symbol carrying data for the first UE and the third symbol carrying data for the second UE. In certain aspects, the gap/RS symbol is used to give a network entity (e.g., communicating with at least the first UE and the second UE) adequate time to switch from a first beam used for transmission/reception of data for the first UE to a second beam used for transmission/reception of data for the second UE (e.g., where the first beam and the second beam are different).

In certain aspects, the frame format illustrated in FIG. 8 is used by a network entity for DL communication to two or more UEs, including at least the first UE and the second UE.

Figure 9:
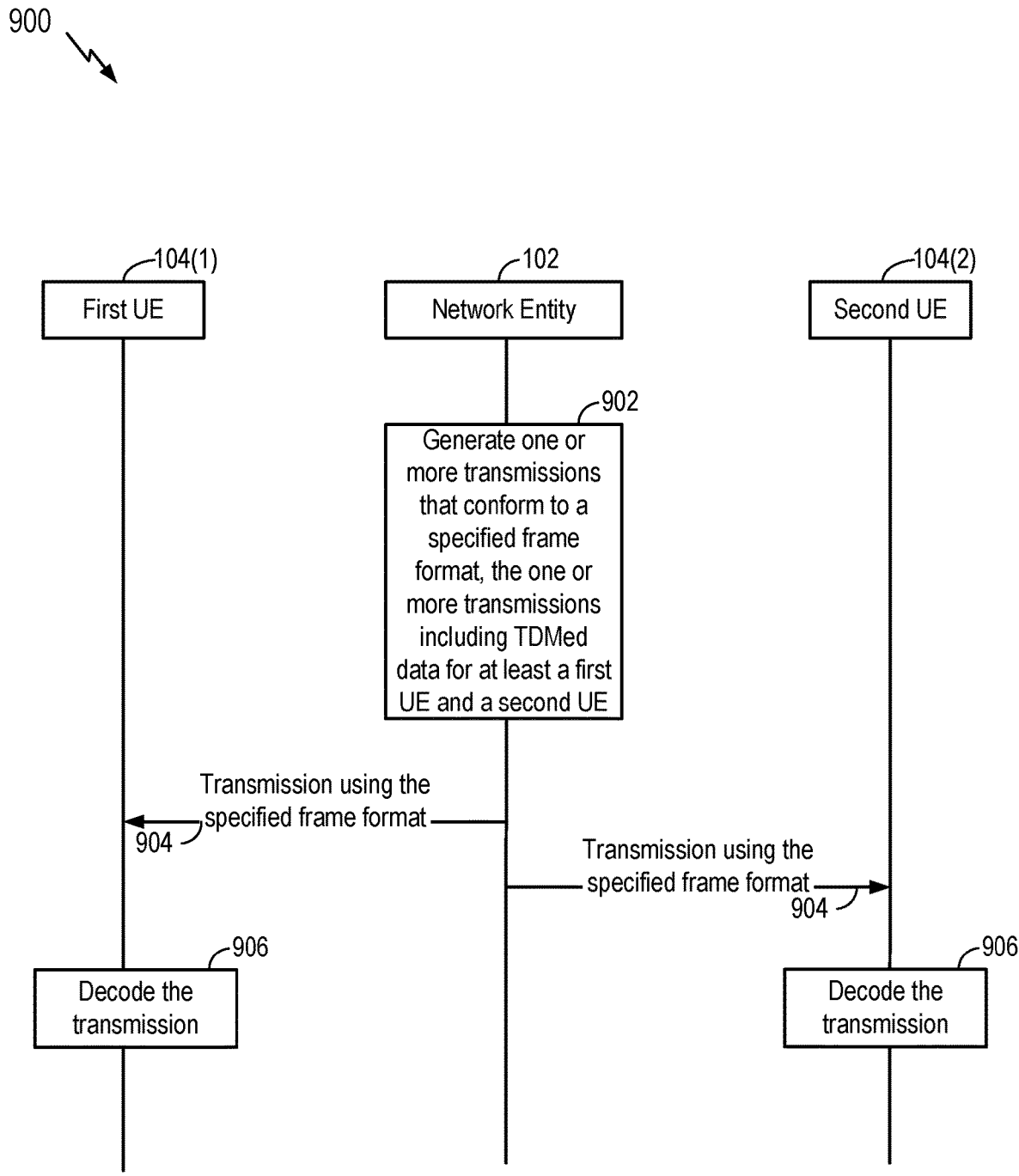
FIG. 9 is a call flow diagram illustrating downlink (DL) communication of time division multiplexed (TDMed) data, in accordance with certain aspects of the present disclosure.

FIG. 9 is a call flow diagram 900 illustrating DL communication of TDMed data, in accordance with certain aspects of the present disclosure.

As shown in FIG. 9, at 902, a network entity 102 generates one or more transmissions that conforms to a specified frame format. The one or more transmissions may include TDMed data for at least a first UE 104(1) and a second UE 104(2) (e.g., may include data for one or more other UEs, as well). The specified frame format may be the frame format illustrated in FIG. 8 (or as described in more detail below, the frame format illustrated in FIG. 12, 14, 16, or 18). At 904, network entity transmits the one or more transmissions using the specified frame format. For example, one transmission may be sent to UE 104(1) followed by a transmission sent to UE 104(2). Accordingly, the network entity 102 communicates with first UE 104(1) and second UE 104(2) using TDM. At 906, first UE 104(1) and second UE 104(2), at the same or different times, each decode the corresponding received transmission.

In certain aspects, a receiver window for receiving the frame format is delayed for at least one of the UEs. A receiver window is a window in time for a receiver to receive signals, and a receiver window may be delayed where the window in time for receiving signals does not align with (e.g., is later in time than) a symbol carrying data for the intended receiver. For example, as illustrated in FIG. 8, the receiver window for the first UE is delayed and may not align with the first symbol. Accordingly, in this example, to account for the delayed receiver window, the gap/RS symbol includes GI1 1204. The gap or RS of the gap/RS symbol may be shorter in time to account for the additional GI1 1204 in the gap/RS symbol. In this example, although the receiver window at the first UE is delayed, the receiver window at the second UE may not also need to be delayed. In other words, although the receiver window for the first UE may not align with the first symbol, the receiver window for the second UE may align with the third symbol.

Figure 10:
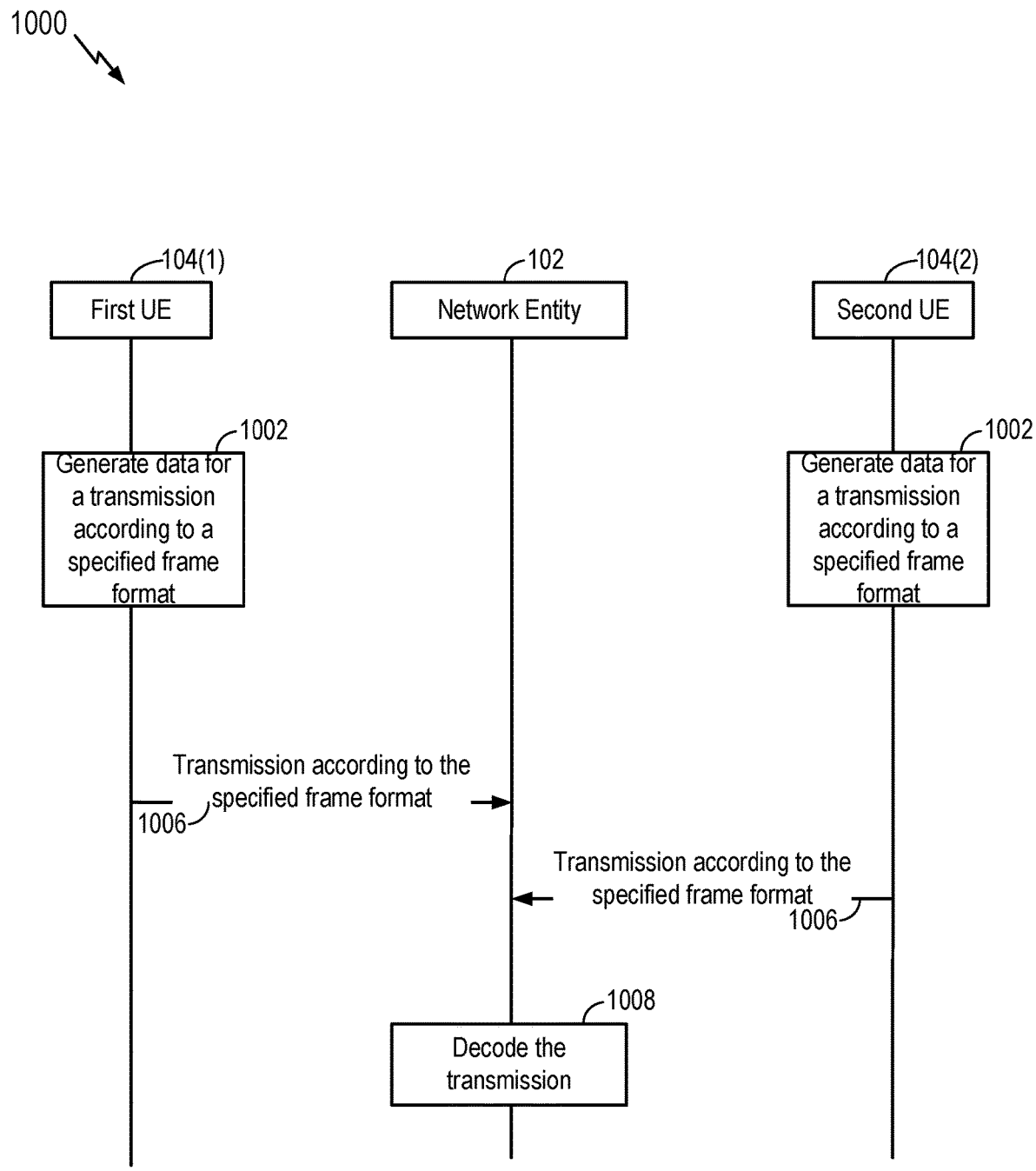
FIG. 10 is a call flow diagram illustrating uplink (UL) communication of TDMed data, in accordance with certain aspects of the present disclosure.

In certain aspects, the frame format illustrated in FIG. 8 is used by the two or more UEs, including at least the first UE and the second UE, for UL communication to the network entity. FIG. 10 is a call flow diagram 1000 illustrating UL communication of TDMed data, in accordance with certain aspects of the present disclosure.

As shown in FIG. 10, at 1002, a first UE 104(1) and a second UE 104(2) each generate data for transmission to a network entity 102. The first UE 104(1) may transmit data at a different time than the second UE 104(2) within a frame, such that data transmissions of each of the UEs is TDMed according to a specified frame format. The specified frame format may be the frame format illustrated in FIG. 8 (or as described in more detail below, the frame format illustrated in FIG. 12, 14, 16, or 18). At 1006, at least first UE 104(1) and second UE 104(2) transmit according to the specified frame format to network entity 102, each of the least first UE 104(1) and second UE 104(2) transmitting at different times using TDM. At 1008, network entity 102 decodes the received transmissions.

In certain aspects, a receiver window for receiving data in the frame format from one of the UEs is delayed for the network entity. For example, the network entity may receive the first data portion for the first UE in the first symbol in a first receiver window delayed in time from the first symbol by a length of the GI1 1202. The network entity may further receive the second data portion for the second UE in the third symbol in a second receiver window aligned in time with the third symbol.

FIG. 11 is a flow diagram illustrating example operations 1100 for wireless communication by a wireless node using a second frame format having gaps and/or RSs between data symbols for different UEs having at least one of different GIs, precoders, or beams, in accordance with certain aspects of the present disclosure. In certain aspects, operations 1100 may be performed by a network entity, for example, by a BS, such as BS 102 in wireless communication network 100. In certain aspects, operations 1100 may be performed by a UE, for example, by UE 104 in wireless communication network 100.

Operations 1100 may be implemented as software components that are executed and run on one or more processors (e.g., controller/processor 240 or controller/processor 280 of FIG. 2). Further, the transmission and reception of signals by the wireless node in operations 1100 may be enabled, for example, by one or more antennas (e.g., antennas 234 or antennas 252 of FIG. 2). In certain aspects, the transmission and/or reception of signals by the wireless node may be implemented via a bus interface of one or more processors (e.g., controller/processor 240 or controller/processor 280) obtaining and/or outputting signals.

Operations 1100 may begin, at block 1110, by the wireless node communicating with a device using a frame format, the frame format comprising: a first symbol comprising a first data portion for a first UE and a first GI corresponding to the first UE; a third symbol comprising a second data portion for a second UE and a second GI corresponding to the second UE, wherein the third symbol is later in time than the first symbol; and one or more second symbols comprising a gap or a RS and a third GI corresponding to the second UE, wherein the one or more second symbols are between the first and third symbol in time.

Figure 12:
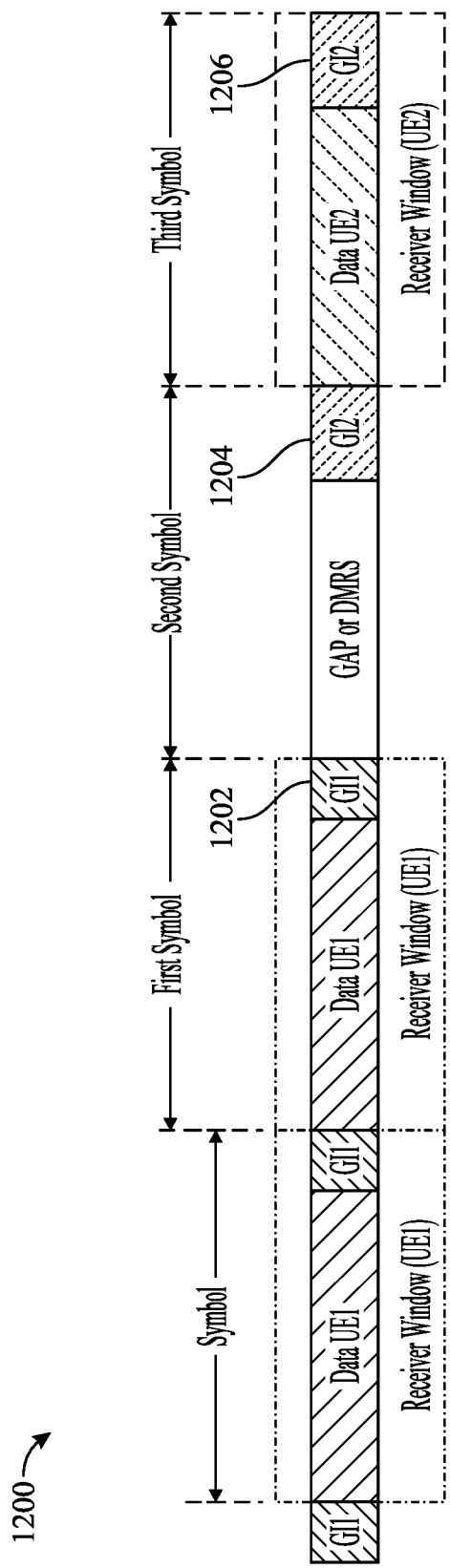
FIG. 12 illustrates an example second frame format having gaps and/or RSs between data symbols for different UEs having at least one of different GIs, precoders, or beams, in accordance with certain aspects of the present disclosure.

FIG. 12 illustrates an example second frame format 1200 having gaps and/or RSs between data symbols for different UEs having at least one of different GIs, precoders, or beams, in accordance with certain aspects of the present disclosure. As shown in FIG. 12, the gap/RS symbol(s) (e.g., the one or more second symbols) may be situated between a first symbol carrying data for a first UE (e.g., UE1) and a third symbol carrying data for the second UE (e.g., UE2). In certain aspects, the gap/RS symbol includes an RS. The gap/RS symbol may include a GI corresponding to the second UE (e.g., GI2 1204). GI2 1204 in the gap/RS symbol may be later in time than the gap/RS.

Further, as shown in FIG. 12, a first symbol may include a first data portion for a first UE and a GI corresponding to the first UE (e.g., GI1 1202). GI1 1202 in the first symbol may be later in time than the first data portion for the first UE in the first symbol. Further, a third symbol may include a second data portion for a second UE and a GI corresponding to the second UE (e.g., GI2 1206). GI2 1206 in the third symbol may be later in time than the second data portion for the second UE in the third symbol. GI1 1202 in the first symbol may be a ZT/ZH GI or a UW GI. GI2 1204 in the one or more second symbols and GI2 1206 in the third symbol may be a ZT/ZH GI or a UW GI.

The gap/RS symbol(s) (e.g., one or more second symbols) may be introduced in the frame format for various reasons. In certain aspects, the gap/RS symbol(s) are used to ensure circular convolution when a length of GI1 1202 is different than a length of GI2 1204, 1206 (e.g., length of GI1≠length of GI2). In certain aspects, the gap/RS symbol(s) are used to ensure circular convolution when a precoder used by the first UE to communicate with a network entity is different than a precoder used by the second UE to communicate with a network entity. In certain aspects, the gap/RS symbol(s) are used to avoid ISI between the first symbol carrying data for the first UE and the third symbol carrying data for the second UE. In certain aspects, the gap/RS symbol is used to give a network entity (e.g., communicating with at least the first UE and the second UE) adequate time to switch from a first beam used for transmission/reception of data for the first UE to a second beam used for transmission/reception of data for the second UE (e.g., where the first beam and the second beam are different).

In certain aspects, the frame format illustrated in FIG. 12 is used by a network entity for DL communication to two or more UEs, including at least the first UE and the second UE. In certain aspects, the frame format illustrated in FIG. 12 is used by the two or more UEs, including at least the first UE and the second UE, for UL communication to the network entity.

As mentioned, a second technique described herein with respect to FIGS. 13, 14A, and 14B for using a frame format that allows multiple different UEs to communicate on a UL or DL channel with a network entity, may introduce gaps in the frame format before and after each GI of each data symbol.

FIG. 13 is a flow diagram illustrating example operations 1300 for wireless communication by a wireless node using a frame format having gaps before and after each GI of each data symbol in the frame format, in accordance with certain aspects of the present disclosure. In certain aspects, operations 1300 may be performed by a network entity, for example, by a BS, such as BS 102 in wireless communication network 100. In certain aspects, operations 1300 may be performed by a UE, for example, by UE 104 in wireless communication network 100.

Operations 1300 may be implemented as software components that are executed and run on one or more processors (e.g., controller/processor 240 or controller/processor 280 of FIG. 2). Further, the transmission and reception of signals by the wireless node in operations 1300 may be enabled, for example, by one or more antennas (e.g., antennas 234 or antennas 252 of FIG. 2). In certain aspects, the transmission and/or reception of signals by the wireless node may be implemented via a bus interface of one or more processors (e.g., controller/processor 240 or controller/processor 280) obtaining and/or outputting signals.

Operations 1300 may begin, at block 1310, by the wireless node communicating with a device using a frame format, the frame format comprising: a first symbol comprising a first data portion for a first UE and a first GI corresponding to the first UE or a second UE, wherein the first data portion is earlier in time than the first GI; a second symbol later in time and adjacent in time to the first symbol, the second symbol comprising a second data portion for the second UE and a second GI corresponding to the second UE, wherein the second data portion is earlier in time than the second GI; a first gap in time between the first data portion and the first GI in the first symbol; and a second gap earlier in time than the second data portion in the second symbol.

FIGS. 14A and 14B illustrate example frame formats 1400A and 1400B, respectively, having gaps before and after each GI of each data symbol in the frame format, in accordance with certain aspects of the present disclosure.

In example frame format 1400A of FIG. 14A, a first symbol may include a first data portion for a first UE (e.g., Data UE1) and a GI 1410. GI 1410 in the first symbol may correspond to both the first UE and the second UE. Further, a second symbol may include a second data portion for a second UE (e.g., Data UE2) and a GI 1412. GI 1412 in the second symbol may correspond to both the first UE and the second UE. Accordingly, a length of each GI contained in each symbol may be the same. In other words, in the example of FIG. 14A, a delay spread for the first UE and the second UE may be the same; thus, GI 1410 in the first symbol containing data for the first UE and GI 1412 in the second symbol containing data for the second UE may be the same, as well. GI 1410 in the first symbol containing data for the first UE and the GI 1412 in the second symbol containing data for the second UE may each comprise a ZT GI or UW GI.

Further, as shown in FIG. 14A, the first data portion may be earlier in time than GI 1410 in the first symbol. The first symbol may also include a first gap 1402 (a gap being a period in time where data communication does not occur) in time between the first data portion and GI 1410. The second data portion may be earlier in time than GI 1412 in the second symbol. The second symbol may also include a second gap 1404 earlier in time than the second data portion in the second symbol. First gap 1402 and second gap 1404 may be a same length. First gap 1402 and second gap 1404 lengths may be greater than a channel delay spread of both the first UE and the second UE.

In cases where the GI lengths are the same (e.g., length of GI 1410=length of GI 1412), as shown in example frame format 1400A of FIG. 14A, issues with precoding and/or different beams used by the different UEs may still exist. Accordingly, in certain aspects, the gaps (e.g., first gap 1402 and second gap 1404) shown in FIG. 14A may be used to ensure circular convolution, e.g., frequency domain equalization (FDE). Accordingly, as mentioned, the gap length may be greater than the channel delay spread.

In certain other aspects, the gaps (e.g., first gap 1402 and second gap 1404) shown in FIG. 14A may be used to give a network entity (e.g., communicating with at least the first UE and the second UE) adequate time to switch from a first beam used for transmission/reception of data for the first UE to a second beam used for transmission/reception of data for the second UE (e.g., where the first beam and the second beam are different). Gaps 1402 and 1404 shown in FIG. 14A may not be needed in the frame format where the first beam used for transmission/reception of data for the first UE and the second beam used for transmission/reception of data for the second UE are the same.

In certain aspects, the first symbol may also include a third gap 1406 earlier in time than the first data portion in the first symbol, such that the first symbol includes two gaps (e.g., first gap 1402 and third gap 1406). In certain aspects, the second symbol may also include a fourth gap 1408 in time between the second data portion and GI 1412, such that the second symbol includes two gaps (e.g., second gap 1404 and fourth gap 1408). Third gap 1406 and fourth gap 1408 lengths may be greater than a channel delay spread of both the first UE and the second UE.

In certain aspects, a first channel bandwidth for the first UE is equal to a second channel bandwidth for the second UE.

Further, as shown in example frame format 1400A of FIG. 14A, a receiver (e.g., the network entity or the first UE) may receive the first data portion and GI 1410 in the first symbol in a first receiver window aligned in time with the first symbol. Similarly, a receiver (e.g., the network entity or the first UE) may receive the second data portion and GI 1412 in the second symbol in a second receiver window aligned in time with the second symbol.

In example frame format 1400B of FIG. 14B, similar to example frame format 1400A of FIG. 14A, a first symbol may include a first data portion for a first UE (e.g., Data UE1) and a GI 1422, and a second symbol may include a second data portion for a second UE (e.g., Data UE2) and a GI 1424. However, unlike FIG. 14A, GI 1422 in the first symbol may correspond to the first UE (e.g., first GI corresponding to the first UE, GI1) or the second UE (e.g., second GI corresponding to the second UE, GI2) and GI 1424 in the second symbol may correspond to the second UE (e.g., GI2). A length of GI1 may not be equal to a length of GI2. In other words, a delay spread for the first UE and a delay spread for the second UE may not be the same.

When a length of GI1 is less than a length of GI2, GI 1422 in the first symbol may be GI2, as shown in FIG. 14B. On the other hand, when a length of GI1 is greater than a length of GI2, GI 1422 in the first symbol may be GI (not shown). In other words, when switching from a first symbol carrying data for a UE with a shorter GI to a second symbol carrying data for a UE with a longer GI, the first symbol may include the longer GI. Similarly, when switching from a first symbol carrying data for a UE with a longer GI to a second symbol carrying data for a UE with a shorter GI, the first symbol may still include the longer GI.

In certain aspects, GI1 and GI2 may each comprise a ZT GI. In certain aspects, GI1 and GI2 may each comprise a UW GI. In some cases, as shown in FIG. 14B, the frame format may further include a third symbol later in time to the second symbol. The third symbol may include a third data portion for a third UE and a third GI 1426 (e.g., GI3 1426) corresponding to the third UE, wherein the third data portion is earlier in time than GI3 1426. GI1, GI2, and GI3 may each comprise a UW GI, and at least one of the first GI or the third GI may be a subsequence of the second GI.

Further, as shown in FIG. 14B, the first data portion may be earlier in time than GI2 1422 in the first symbol. The first symbol may also include a first gap 1414 in time between the first data portion and GI2 1422 in the first symbol. The second data portion may be earlier in time than GI2 1424 in the second symbol. The second symbol may also include a second gap 1416 earlier in time than the second data portion in the second symbol. First gap 1414 and second gap 1416 may be different lengths. In particular, a first length of first gap 1414 may be greater than a first delay spread for the first UE, and a second length of second gap 1416 may be greater than a second delay spread for the second UE.

Similar to FIG. 14A, gaps 1414 and 1416 shown in FIG. 14B may be used to ensure circular convolution, and/or account for a beam switching delay at the network entity.

In certain aspects, the first symbol may also include a third gap 1418 earlier in time than the first data portion in the first symbol, such that the first symbol includes two gaps (e.g., first gap 1414 and third gap 1418). In certain aspects, the second symbol may also include a fourth gap 1420 in time between the second data portion and GI 1424, such that the second symbol includes two gaps (e.g., second gap 1416 and fourth gap 1420). A third length of third gap 1418 may be greater than the first delay spread for the first UE, and a fourth length of fourth gap 1420 may be greater than the second delay spread for the second UE.

In certain aspects, a first channel bandwidth for the first UE is equal to a second channel bandwidth for the second UE.

Further, as shown in example frame format 1400B of FIG. 14B, a receiver (e.g., the network entity or the first UE) may receive the first data portion and GI 1422 in the first symbol in a first receiver window aligned in time with the first symbol. Similarly, a receiver (e.g., the network entity or the first UE) may receive the second data portion and GI 1424 in the second symbol in a second receiver window aligned in time with the second symbol.

In certain aspects, the frame formats illustrated in FIGS. 14A and 14B are used by a network entity for DL communication to two or more UEs, including at least the first UE and the second UE. In certain aspects, the frame formats illustrated in FIGS. 14A and 14B are used by the two or more UEs, including at least the first UE and the second UE, for UL communication to the network entity.

As mentioned, a third technique described herein with respect to FIGS. 15 and 16 for using a frame format that allows multiple different UEs to communicate on a UL or DL channel with a network entity, may introduce gaps in the frame format to account for additional delay spread of the multiple UEs while keeping GIs used in the frame format constant.

FIG. 15 is a flow diagram illustrating example operations 1500 for wireless communication by a wireless node using a frame format having gaps to account for additional delay spread of the multiple UEs while keeping GIs used in the frame format constant, in accordance with certain aspects of the present disclosure. In certain aspects, operations 1500 may be performed by a network entity, for example, by a BS, such as BS 102 in wireless communication network 100. In certain aspects, operations 1500 may be performed by a UE, for example, by UE 104 in wireless communication network 100.

Operations 1500 may be implemented as software components that are executed and run on one or more processors (e.g., controller/processor 240 or controller/processor 280 of FIG. 2). Further, the transmission and reception of signals by the wireless node in operations 1500 may be enabled, for example, by one or more antennas (e.g., antennas 234 or antennas 252 of FIG. 2). In certain aspects, the transmission and/or reception of signals by the wireless node may be implemented via a bus interface of one or more processors (e.g., controller/processor 240 or controller/processor 280) obtaining and/or outputting signals.

Operations 1500 may begin, at block 1510, by the wireless node communicating with a device using a frame format, the frame format comprising: a first symbol comprising a first data portion for a first UE and a first GI corresponding to the first UE, wherein the first data portion is earlier in time than the first GI; a second symbol later in time and adjacent in time to the first symbol, the second symbol comprising a second data portion for a second UE and a second GI corresponding to the second UE, wherein the second data portion is earlier in time than the second GI, wherein a length of the first GI is equal to a length of the second GI; and at least one of: a first gap in time between the first data portion and the first GI in the first symbol; or a second gap in time between the first GI and the second data portion in the second symbol.

Figure 16A:
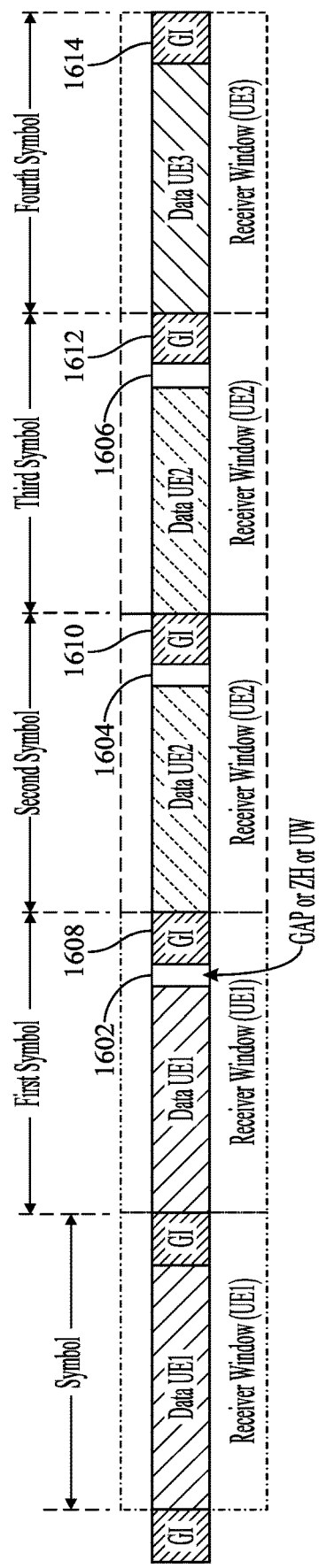
FIGS. 16A and 16B illustrate example frame formats having gaps to account for additional delay spread of the multiple UEs while keeping GIs used in the frame format constant, in accordance with certain aspects of the present disclosure.
Figure 16B:
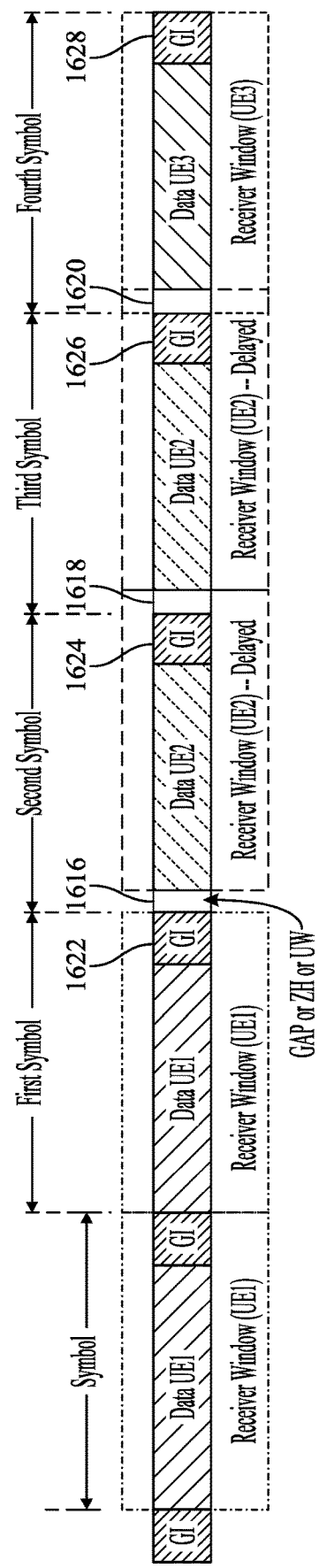

FIGS. 16A and 16B illustrate example frame formats 1600A and 1600B, respectively, having gaps to account for additional delay spread of the multiple UEs while keeping GIs used in the frame format constant, in accordance with certain aspects of the present disclosure.

In example frame formats 1600A and 1600B of FIGS. 16A and 16B, a first symbol may include a first data portion for a first UE (e.g., Data UE1) and a first GI (e.g., first GI 1608 in example frame format 1600A and first GI 1622 in example frame format 1600B). Further, a second symbol may include a second data portion for a second UE (e.g., Data UE2) and a second GI (e.g., second GI 1610 in example frame format 1600A and second GI 1624 in example frame format 1600B). GIs used in the frame format may be kept constant across UEs; thus, a length of each GI (e.g., first GI 1608 and second GI 1610 in example frame format 1600A and first GI 1622 and second GI 1624 in example frame format 1600B) contained in each symbol may be the same (e.g., length of first GI 1608=length of second GI 1610 and length of first GI 1622=length of second GI 1624). However, a delay spread for the first UE and the second UE may not be the same. Accordingly, to account for such differences in delay spread across different UEs (e.g., different delay spreads for the first UE and the second UE), without manipulating GI lengths in the frame format, gaps may be introduced.

As shown in example frame format 1600A in FIG. 16A, in some cases, a gap, gap 1602, may be included in the first symbol. Gap 1602 may be later in time than the data portion of the first UE but earlier in time than first GI 1608 corresponding to the first UE in the first symbol (e.g., between the first data portion and first GI 1608 in time). Similarly, a gap 1604 may be included in the second symbol between the data portion for the second UE and second GI 1610. A gap, such as gap 1602, may be included in the first symbol between the first data portion and first GI 1608 when a delay spread for the first UE is shorter than a delay spread for the second UE.

Similarly, using this logic, a gap 1606 may be included in a third symbol between a third data portion for the second UE and a third GI 1612 when a delay spread for the second UE is shorter than a delay spread for the third UE (e.g., when the third symbol include data for the second UE and the fourth symbol includes data for the third UE). A data portion for the third UE (e.g., Data UE3) may be included in the fourth symbol prior in time a fourth GI 1614, such as without a gap in certain aspects.

Further, in this case, a receiver window for transmitting/receiving the first data portion may not be delayed and the network entity (e.g., for UL transmissions) or the first UE (e.g., for DL transmissions) may still receive the first data portion for the first UE and first GI 1608 in the first symbol in the receiver window. However, the first data portion for the first UE in the first symbol may be shortened in time to allow for gap 1602 in the first symbol. Similarly, a receiver (e.g., the network entity, the first UE, the second UE, or the third UE) may receive the second data portion for the second UE and second GI 1610 in the second symbol in a second receiver window aligned in time with the second symbol, the third data portion for the second UE and third GI 1612 in the third symbol in a third receiver window aligned in time with the third symbol, and/or the third data portion for the third UE and fourth GI 1614 in the fourth symbol in a fourth receiver window aligned in time with the fourth symbol.

Alternatively, as shown in example frame format 1600B in FIG. 16B, in some cases, a gap, gap 1616, may be included in the second symbol as opposed to the first symbol. Gap 1616 may be earlier in time than the second data portion for the second UE (e.g., Data UE2) in the second symbol. A gap, such as gap 1616, may be included in the second symbol earlier in time than the second data portion in the second symbol when a delay spread for a UE having data in a prior, adjacent symbol in time (e.g., the first UE in the first symbol) is longer than the delay spread for a UE having data in the second symbol (e.g., the second UE in the second symbol). In this case, the first symbol containing a first data portion for the first UE (e.g., Data UE1) may not include a gap, while the second symbol containing the second data portion does include gap 1616.

Further, in this case, a receiver window for transmitting/receiving the second data portion may be delayed (e.g., delayed by gap 1616), and the network entity (e.g., for UL transmissions) or the second UE (e.g., for DL transmissions) may still receive the second data portion and the second GI (e.g., second GI 1624) in the second symbol in the receiver window. However, the second data portion in the second symbol may be shortened in time to allow for gap 1616 in the second symbol. Accordingly, a receiver window for receiving the second data portion contained in the third symbol (e.g., a third symbol containing a third GI 1626 and gap 1618 where gap 1618 is prior in time to the second data portion and GI 1626 is later in time than the second data portion) may also be delayed. However, a receiver window for receiving data in a fourth symbol for another UE after the third symbol may not be delayed. In particular, as shown in FIG. 16B, a fourth symbol may include a third data portion for a third UE (e.g., Data UE3), a gap 1620 earlier in time than the third data portion, and a fourth GI 1628 later in time than the third data portion. The receiver window for receiving the third data portion for the third UE and fourth GI 1628 may be aligned with the fourth symbol, and further overlap in time with a receiver window used to receive the second data portion for the second UE and third GI 1626. Accordingly, gap 1620 may be within both receiver windows.

In certain aspects, first GI 1622 in the first symbol, second GI 1624 in the second symbol, the third GI 1626 in the third symbol, and the fourth GI 1628 in the fourth symbol each comprise a ZT GI or a UW GI.

In certain aspects, the first UE communicates with a device (e.g., the network entity), using the frame format illustrated in FIGS. 16A and 16B, using a same precoder that is used by the second UE for communicating with the device. The first UE and the second UE using a same precoder helps to ensure circular convolution, e.g., frequency domain equalization (FDE). The first UE and the second UE may also use a same precoder that is used by the third UE for communicating with the device.

In certain aspects, gap 1602, gap 1606, gap 1616, or gap 1620 shown in FIG. 16A and FIG. 16B, respectively, may be used to give a network entity (e.g., communicating with at least the first UE and the second UE) adequate time to switch from a first beam used for transmission/reception of data for the first UE to a second beam used for transmission/reception of data for the second UE (e.g., where the first beam and the second beam are different). However, where a length of the first GI 1608 and gap 1602, a length of the third GI 1612 and gap 1606, a length of the first GI 1622 and gap 1616, or a length of the third GI and gap 1620 is less than a duration of a beam switching delay needed by a network entity to switch beams (e.g., switch from one beam used for communication with the first UE to another beam used for communication with the second UE or switch from one beam used for communication with the second UE to another beam used for communication with the third UE), the first UE and the second UE or the second UE and the third UE may communicate with the network entity using a same beam.

In certain aspects, a first channel bandwidth for the first UE is equal to a second channel bandwidth for the second UE. In certain aspects, the second channel bandwidth for the second UE is equal to a third channel bandwidth for the third UE.

In certain aspects, the frame formats illustrated in FIGS. 16A and 16B are used by a network entity for DL communication to two or more UEs, including at least the first UE and the second UE. In certain aspects, the frame formats illustrated in FIGS. 16A and 16B are used by the two or more UEs, including at least the first UE and the second UE, for UL communication to the network entity.

As mentioned, a fourth technique described herein with respect to FIGS. 17 and 18 for using a frame format that allows multiple different UEs to communicate on a UL or DL channel with a network entity, may introduce additional GIs in the frame format used for communication between the different UEs and the network entity.

FIG. 17 is a flow diagram illustrating example operations 1700 for wireless communication by a wireless node using a frame format having additional GIs, in accordance with certain aspects of the present disclosure. In certain aspects, operations 1700 may be performed by a network entity, for example, by a BS, such as BS 102 in wireless communication network 100. In certain aspects, operations 1700 may be performed by a UE, for example, by UE 104 in wireless communication network 100.

Operations 1700 may be implemented as software components that are executed and run on one or more processors (e.g., controller/processor 240 or controller/processor 280 of FIG. 2). Further, the transmission and reception of signals by the wireless node in operations 1700 may be enabled, for example, by one or more antennas (e.g., antennas 234 or antennas 252 of FIG. 2). In certain aspects, the transmission and/or reception of signals by the wireless node may be implemented via a bus interface of one or more processors (e.g., controller/processor 240 or controller/processor 280) obtaining and/or outputting signals.

Operations 1700 may begin, at block 1710, by the wireless node communicating using a frame format, the frame format comprising: a first symbol comprising a first data portion for a first UE and a first GI corresponding to the first UE, wherein the first GI is at least one of: later in time than the first data portion; or earlier in time than the first data portion; a second symbol later in time and adjacent in time to the first symbol, the second symbol comprising a second data portion for a second UE; and a second GI corresponding to the second UE, wherein the second GI is at least one of: when the first GI is later in time than the first data portion, part of the second symbol and earlier in time than the second data portion of the second symbol; or when the first GI is earlier in time than the first data portion, part of the first symbol and later in time than the first data portion of the first symbol.

Figure 18A:
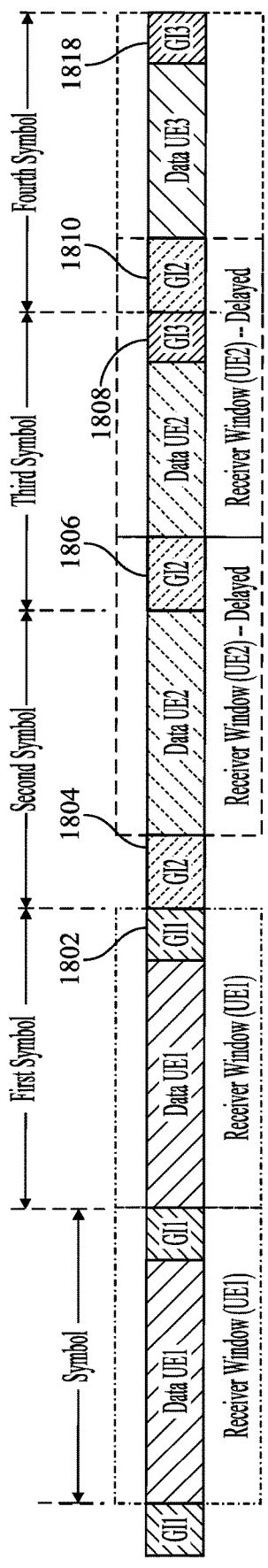
FIGS. 18A and 18B illustrate example frame formats having additional GIs, in accordance with certain aspects of the present disclosure.
Figure 18B:
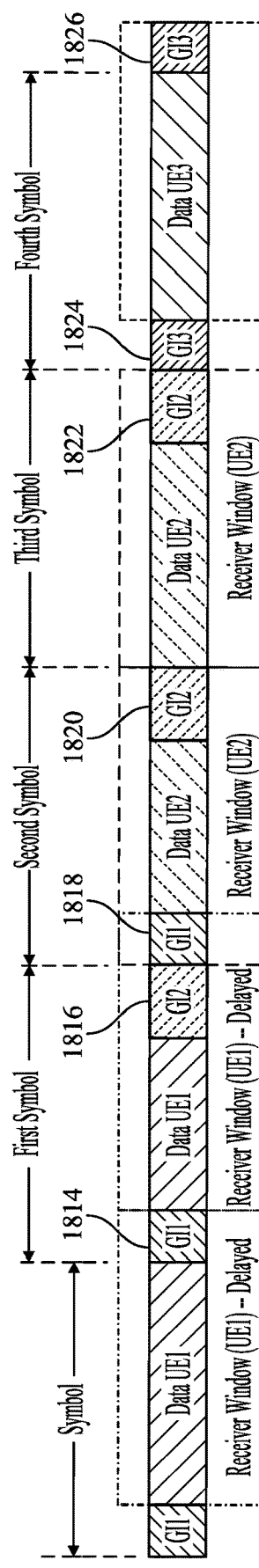

FIGS. 18A and 18B illustrate example frame formats 1800A and 1800B, respectively, having additional GIs, in accordance with certain aspects of the present disclosure. Additional GIs may be introduced, for example, to allow for delayed receiver windows for some UEs, but not all UEs of the frame format.

In particular, as shown in example frame format 1800A of FIG. 18A, a first symbol may include a first data portion for a first UE (e.g., Data UE1) and a first GI corresponding to the first UE (e.g., GI1 1802). GI1 1802 in the first symbol may be later in time than the first data portion for the first UE in the first symbol. Further, a second symbol may include a second data portion for a second UE (e.g., Data UE2). Because GI1 1802 is later in time than the first data portion for the first UE, a GI corresponding to the second UE (e.g., GI2 1804) is part of the second symbol and earlier in time than the second data portion for the second UE of the second symbol.

GI2 1804 may be considered the "additional" GI in this example frame format 1800A because instead of having only one GI between symbols, two GIs (namely, GI1 1802 and GI2 1804) are present between the first data portion in first symbol and the second data portion in the second symbol. The two GIs, GI1 1802 and GI2 1804, may be adjacent in time.

Further, as shown in example frame format 1800A of FIG. 18A, a receiver (e.g., the network entity or the first UE) may receive the first data portion and GI1 1802 in the first symbol in a first receiver window aligned in time with the first symbol. However, a receiver (e.g., the network entity or the second UE) may receive the second data portion in the second symbol in a second receiver window delayed in time from the second symbol by a length of GI2 1804 (e.g., given the frame format comprises the first GI later in time than the first data portion in the first symbol).

Alternatively, in example frame format 1800B of FIG. 18B, a first symbol may include a first data portion for a first UE (e.g., Data UE1) and a first GI corresponding to the first UE (e.g., GI1 1814). GI1 1814 in the first symbol may be earlier in time than the first data portion for the first UE in the first symbol. Further, a second symbol may include a second data portion for a second UE (e.g., Data UE2). Because GI1 1814 is earlier in time than the first data portion for the first UE, a GI corresponding to the second UE (e.g., GI2 1816) is part of the first symbol and later in time than the first data portion of the first symbol. Further, a third GI corresponding to the first UE (e.g., GI1 1818) may be included as part of the second symbol and earlier in time than the second data portion of the second symbol. Also, a fourth GI corresponding to the second UE (e.g., GI2 1820) as part of the second symbol and later in time than the second data portion of the second symbol.

GI1 1818 may be considered the "additional" GI in this example frame format 1800B because instead of having only one GI between symbols, two GIs (namely, GI2 1816 and GI1 1818) are present between the first data portion in the first symbol and the second data portion in the second symbol. The two GIs, GI2 1816 and GI1 1818, may be adjacent in time.

Further, as shown in example frame format 1800B of FIG. 18B, a receiver (e.g., the network entity or the first UE) may receive the first data portion in a first receiver window delayed in time from the first symbol by a length of the first GI, wherein the network entity receives the first data portion and GI2 1816 in the first symbol and GI1 1818 in the second symbol in the first receiver window. However, a receiver (e.g., the network entity or the second UE) may receive the second data portion in the second symbol in a second receiver window aligned in time with the second symbol, wherein the receiver receives GI1 1818, the second data portion, and GI2 1820 in the second symbol in the second receiver window, wherein the first receiver window and the second receiver window overlap in time.

Rules for GI placement in the frame format illustrated for the first and second symbols in FIG. 18A and FIG. 18B may be combined in cases where data for three or more UEs are transmitted in a frame format.

For example, as shown in FIG. 18A, a third data portion for a third UE (e.g., Data UE3) may be transmitted in the frame format in a fourth symbol. The immediately preceding symbol in time to the fourth symbol, e.g., the third symbol, may include a second data portion for the second UE (e.g., Data UE2) and a GI corresponding to the second UE (e.g., GI2 1806). GI1 1806 in the third symbol may be earlier in time than the second data portion for the second UE in the third symbol. Thus, according to the rule described with respect to FIG. 18B above, given GI2 1806 is earlier in time than the second data portion for the second UE in the third symbol, a GI corresponding to the third UE (e.g., GI3 1808)

is part of the third symbol and later in time than the second data portion of the third symbol. Further, a GI corresponding to the second UE (e.g., GI2 1810) may be included as part of the fourth symbol and earlier in time than the third data portion of the fourth symbol. Also, a GI corresponding to the third UE (e.g., GI3 1812) may be included as part of the fourth symbol and later in time than the third data portion of the fourth symbol. GI2 1810 may be considered another "additional" GI in this example frame format 1800B because instead of having only one GI between symbols, two GIs (namely, GI3 1808 and GI2 1810) are present between the second data portion in the third symbol and the third data portion in the fourth symbol. The two GIs, GI3 1808 and GI2 1810, may be adjacent in time. Further, as illustrated for the first and second symbols in FIG. 18B, a receiver window for receiving the second data portion, GI3 1808, and GI2 1810 may overlap a receiver window for receiving GI2 1810, the third data portion, and GI3 1812. Accordingly, a receiver (e.g., the network entity or the second UE) may receive the third data portion in the fourth symbol in a receiver window aligned in time with the fourth symbol, wherein the receiver receives GI2 1810, the third data portion, and GI3 1812 in the fourth symbol in the receiver window.

As another example, as shown in FIG. 18B, a third data portion for a third UE (e.g., Data UE3) may be transmitted in the frame format in a fourth symbol. The immediately preceding symbol in time to the fourth symbol, e.g., the third symbol, may include a second data portion for the second UE (e.g., Data UE2) and a GI corresponding to the second UE (e.g., GI2 1822). Because GI2 1822 is later in time than the second data portion for the second UE in the third symbol, a GI corresponding to the third UE (e.g., GI3 1824) is part of the fourth symbol and earlier in time than the third data portion for the third UE of the fourth symbol. GI3 1824 may be considered the "additional" GI in this example frame format 1800B because instead of having only one GI between symbols, two GIs (namely, GI2 1822 and GI3 1824) are present between the second data portion in third symbol and the third data portion in the fourth symbol. The two GIs, GI2 1822 and GI3 1824, may be adjacent in time. Further, as illustrated for the first and second symbols in FIG. 18B a receiver window for receiving the third data portion for the third UE may be delayed.

GIs (and delay spreads) corresponding to the at least two UEs in the frame format may be the same or different. Each GI corresponding to the at least two UEs may be a ZT/ZH GI or a UW GI.

In certain aspects, a first channel bandwidth for the first UE is equal to a second channel bandwidth for the second UE. Further, in certain aspects, a first beam used for transmission/reception of data for the first UE may be different than a second beam used for transmission/reception of data for the second UE when the beam switching delay needed by a network entity to switch beams (e.g., switch from one beam used for communication with the first UE to another beam used for communication with the second UE) is less than an aggregate GI1 and GI2 between the first data portion for the first UE and second data portion for the second UE in time.

In certain aspects, the frame formats illustrated in FIGS. 18A and 18B are used by a network entity for DL communication to two or more UEs, including at least the first UE and the second UE. In certain aspects, the frame formats illustrated in FIGS. 18A and 18B are used by the two or more UEs, including at least the first UE and the second UE, for UL communication to the network entity.

Example Wireless Communication Devices

Figure 19:
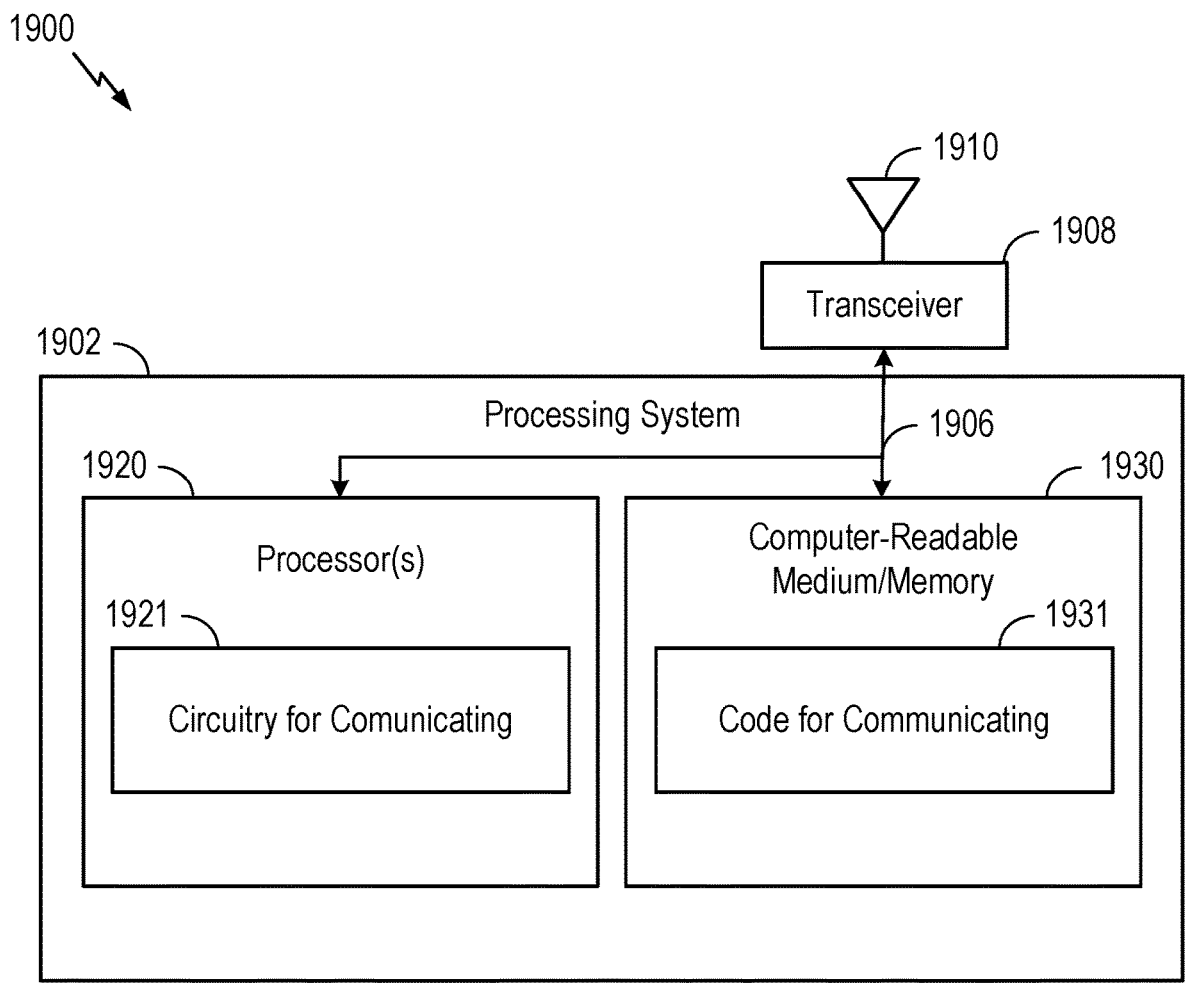
FIG. 19 depicts aspects of an example communications device, in accordance with certain aspects of the present disclosure.

FIG. 19 depicts an example communications device 1900 that includes various components operable, configured, or adapted to perform operations for the techniques disclosed herein, such as the operations depicted and described with respect to FIGS. 7, 11, 13, 15, and 17. In some examples, communication device 1900 may be a network entity, such as BS 102 as described, for example with respect to FIGS. 1 and 2. In some examples, communication device 1900 may be a UE 104 as described, for example with respect to FIGS. 1 and 2.

Communications device 1900 includes a processing system 1902 coupled to a transceiver 1908 (e.g., a transmitter and/or a receiver). Transceiver 1908 is configured to transmit (or send) and receive signals for communications device 1900 via an antenna 1910, such as the various signals as described herein. Processing system 1902 may be configured to perform processing functions for communications device 1900, including processing signals received and/or to be transmitted by communications device 1900.

Processing system 1902 includes one or more processors 1920 coupled to a computer-readable medium/memory 1930 via a bus 1906. In certain aspects, computer-readable medium/memory 1930 is configured to store instructions (e.g., computer-executable code) that when executed by the one or more processors 1920, cause the one or more processors 1920 to perform the operations illustrated in FIGS. 7, 11, 13, 15, and 17, or other operations for performing the various techniques discussed herein.

In the depicted example, computer-readable medium/memory 1930 stores code 1931 (e.g., an example means for) for communicating. In certain aspects, code 1931 for communicating may include code for communicating with a device using a frame format, the frame format comprising time division multiplexed (TDMed) data for multiple UEs and guard intervals (GIs) for the multiple UEs.

In the depicted example, the one or more processors 1920 include circuitry configured to implement the code stored in the computer-readable medium/memory 1930, including circuitry 1921 (e.g., an example means for) for communicating. In certain aspects, circuitry 1921 for communicating may include circuitry for communicating with a device using a frame format, the frame format comprising TDMed data for multiple UEs and guard intervals (GIs) for the multiple UEs.

Various components of communications device 1900 may provide means for performing the methods described herein, including with respect to FIGS. 7, 11, 13, 15, and 17.

Means for communicating may include means for transmitting and means for receiving. In some examples, means for transmitting or sending (or means for outputting for transmission) may include transceivers 232 and/or antenna(s) 234 of BS 102 or transceivers 254 and/or antenna(s) 252 of UE 104 illustrated in FIG. 2 and/or transceiver 1908 and antenna 1910 of communication device 1900 in FIG. 19. In some examples, means for receiving (or means for obtaining) may include transceivers 232 and/or antenna(s) 234 of BS 10 or transceivers 254 and/or antenna(s) 252 of UE 104 illustrated in FIG. 2 and/or transceiver 1908 and antenna 1910 of communication device 1900 in FIG. 19.

In some cases, rather than actually transmitting, for example, signals and/or data, a device may have an interface to output signals and/or data for transmission (a means for outputting). For example, a processor may output signals and/or data, via a bus interface, to a radio frequency (RF) front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

Notably, FIG. 19 is an example, and many other examples and configurations of communication device 1900 are possible.

Example Clauses

Implementation examples are described in the following numbered clauses:

Clause 1: A method for wireless communication by a wireless node, comprising: communicating with a device using a frame format, the frame format comprising a first symbol, a second symbol, and a third symbol, wherein: the first symbol comprises a first data portion for a first user equipment (UE) and a first guard interval (GI) corresponding to the first UE; the third symbol comprises a second data portion for a second UE and a second GI corresponding to the second UE, wherein the third symbol is later in time than the first symbol; and the second symbol comprises a gap or a reference signal (RS), a third GI corresponding to the first UE, and a fourth GI corresponding to the second UE, wherein the second symbol is between the first and third symbol in time.

Clause 2: The method of Clause 1, wherein the first GI is earlier in time than the first data portion for the first UE in the first symbol.

Clause 3: The method of Clause 1 or 2, wherein the second GI is later in time than the second data portion for the second UE in the third symbol.

Clause 4: The method of any one of Clauses 1-3, wherein: the third GI is earlier in time than the gap or the RS in the second symbol; and the fourth GI is later in time than the gap or the RS in the second symbol.

Clause 5: The method of any one of Clauses 1-4, wherein: the first GI and the third GI are a same first length; and the second GI and the fourth GI are a same second length.

Clause 6: The method of Clause 5, wherein the first length is different than the second length.

Clause 7: The method of Clause 5 or 6, wherein: the first GI and the third GI each comprise a zero tail (ZT) GI, a zero head (ZH) GI, or a unique word (UW) GI; and the second GI and the fourth GI each comprise a ZT GI, a ZH GI, or a UW GI.

Clause 8: The method of any one of Clauses 1-7, wherein the wireless node comprises the first UE, and wherein the first UE communicates with the device using a first precoder different than a second precoder used by the second UE for communicating with the device.

Clause 9: The method of any one of Clauses 1-8, wherein the wireless node comprises the first UE, and wherein the first UE communicates with the device using a first beam different than a second beam used by the second UE for communicating with the device.

Clause 10: The method of any one of Clauses 1-9, wherein a first channel bandwidth for the first UE is equal to a second channel bandwidth for the second UE.

Clause 11: The method of any one of Clauses 1-10, wherein the wireless node comprises the first UE, and communicating with the device using the frame format comprises: receiving the first data portion in the first symbol in a receiver window delayed in time from the first symbol by a length of the first GI, wherein the first UE receives the first data portion in the first symbol and the third GI in the second symbol in the receiver window.

Clause 12: The method of any one of Clauses 1-11, wherein the wireless node comprises a network entity, and communicating with the device using the frame format comprises: receiving the first data portion in the first symbol in a first receiver window delayed in time from the first symbol by a length of the first GI, wherein the network entity receives the first data portion in the first symbol and the third GI in the second symbol in the first receiver window; and receiving the second data portion in the third symbol in a second receiver window aligned in time with the third symbol, wherein the network entity receives the second data portion and the second GI in the third symbol in the second receiver window.

Clause 13: The method of any one of Clauses 1-12, wherein: the wireless node comprises a network entity; and the device comprises the first UE or the second UE.

Clause 14: The method of any one of Clauses 1-13, wherein: the wireless node comprises the first UE or the second UE; and the device comprises a network entity.

Clause 15: A method for wireless communication by a wireless node, comprising: communicating with a device using a frame format, the frame format comprising a first symbol, one or more second symbols, and a third symbol, wherein: the first symbol comprises a first data portion for a first user equipment (UE) and a first guard interval (GI) corresponding to the first UE; the third symbol comprises a second data portion for a second UE and a second GI corresponding to the second UE, wherein the third symbol is later in time than the first symbol; and the one or more second symbols comprise a gap or a reference signal (RS) and a third GI corresponding to the second UE, wherein the one or more second symbols are between the first and third symbol in time.

Clause 16: The method of Clause 15, wherein the first GI is later in time than the first data portion for the first UE in the first symbol.

Clause 17: The method of Clause 15 or 16, wherein the second GI is later in time than the second data portion for the second UE in the third symbol.

Clause 18: The method of any one of Clauses 15-17, wherein the third GI is later in time than the gap or the RS in the one or more second symbols.

Clause 19: The method of any one of Clauses 15-18, wherein: the first GI is a first length; and the second GI and the third GI are a same second length.

Clause 20: The method of Clause 19, wherein the first length is different than the second length.

Clause 21: The method of Clause 19 or 20, wherein: the first GI comprises a zero tail (ZT) GI, a zero head (ZH) GI, or a unique word (UW) GI; and the second GI and the third GI each comprise a ZT GI, a ZH GI, or a UW GI.

Clause 22: The method of any one of Clauses 15-21, wherein the wireless node comprises the first UE, and wherein the first UE communicates with the device using a first precoder different than a second precoder used by the second UE for communicating with the device.

Clause 23: The method of any one of Clauses 15-22, wherein the wireless node comprises the first UE, and wherein the first UE communicates with the device using a first beam different than a second beam used by the second UE for communicating with the device.

Clause 24: The method of any one of Clauses 15-23, wherein: the wireless node comprises a network entity; and the device comprises the first UE or the second UE.

Clause 25: The method of any one of Clauses 15-24, wherein: the wireless node comprises the first UE or the second UE; and the device comprises a network entity.

Clause 26: A method for wireless communication by a wireless node, comprising: communicating with a device using a frame format, the frame format comprising: a first symbol comprising a first data portion for a first user equipment (UE) and a first guard interval (GI) corresponding to the first UE or a second UE, wherein the first data portion is earlier in time than the first GI; a second symbol later in time and adjacent in time to the first symbol, the second symbol comprising a second data portion for the second UE and a second GI corresponding to the second UE, wherein the second data portion is earlier in time than the second GI; a first gap in time between the first data portion and the first GI in the first symbol; and a second gap earlier in time than the second data portion in the second symbol.

Clause 27: The method of Clause 26, wherein the first GI and the second GI are a same length.

Clause 28: The method of Clause 27, wherein: the first gap and the second gap are a same length; and the same length is greater than a delay spread for the first UE and the second UE.

Clause 29: The method of any one of Clauses 26-28, wherein: when a length of the first GI is less than a length of the second GI, the first GI corresponds to the second UE; and when the length of the first GI is greater than the length of the second GI, the first GI corresponds to the first UE.

Clause 30: The method of Clause 29, wherein: a first length of the first gap is greater than a first delay spread for the first UE; and a second length of the second gap is greater than a second delay spread for the second UE.

Clause 31: The method of any one of Clauses 26-30, wherein: the first GI and the second GI each comprise a zero tail (ZT) GI or a unique word (UW) GI.

Clause 32: The method of any one of Clauses 26-31, further comprising: a third symbol later in time to the second symbol, the third symbol comprising a third data portion for a third UE and a third GI corresponding to the third UE, wherein the third data portion is earlier in time than the third GI.

Clause 33: The method of Clause 32, wherein: the first GI, the second GI, and the third GI each comprise a UW GI; and at least one of the first GI or the third GI is a subsequence of the second GI.

Clause 34: The method of any one of Clauses 26-33, wherein the wireless node comprises the first UE, and wherein the first UE communicates with the device using a first precoder different than a second precoder used by the second UE for communicating with the device.

Clause 35: The method of any one of Clauses 26-34, wherein the wireless node comprises the first UE, and wherein the first UE communicates with the device using a first beam different than a second beam used by the second UE for communicating with the device when a length of the first GI is larger in time than a beam switching delay of the device.

Clause 36: The method of any one of Clauses 26-36, wherein a first channel bandwidth for the first UE is equal to a second channel bandwidth for the second UE.

Clause 37: The method of any one of Clauses 26-36, wherein: the wireless node comprises a network entity; and the device comprises the first UE or the second UE.

Clause 38: The method of any one of Clauses 26-37, wherein: the wireless node comprises the first UE or the second UE; and the device comprises a network entity.

Clause 39: A method for wireless communication by a wireless node, comprising: communicating with a device using a frame format, the frame format comprising: a first symbol comprising a first data portion for a first user equipment (UE) and a first guard interval (GI) corresponding to the first UE, wherein the first data portion is earlier in time than the first GI; a second symbol later in time and adjacent in time to the first symbol, the second symbol comprising a second data portion for a second UE and a second GI corresponding to the second UE, wherein the second data portion is earlier in time than the second GI, wherein a length of the first GI is equal to a length of the second GI; and at least one of: a first gap in time between the first data portion and the first GI in the first symbol; or a second gap earlier in time than the second data portion in the second symbol.

Clause 40: The method of Clause 39, wherein: when a delay spread for the first UE is shorter than a delay spread for the second UE, the frame format comprises the first gap in time; and when the delay spread for the first UE is longer than the delay spread for the second UE, the frame format comprises the second gap in time.

Clause 41: The method of Clause 39 or 40, wherein: the first GI and the second GI each comprise a zero tail (ZT) GI or a unique word (UW) GI.

Clause 42: The method of any one of Clauses 39-41, wherein the wireless node comprises the first UE, and wherein the first UE communicates with the device using a same precoder used by the second UE for communicating with the device.

Clause 43: The method of any one of Clauses 39-42, wherein the wireless node comprises the first UE, and wherein the first UE communicates with the device using a first beam different than a second beam used by the second UE for communicating with the device when a length of the first GI and the first gap or the second gap is larger in time than a beam switching delay of the device.

Clause 44: The method of any one of Clauses 39-43, wherein a first channel bandwidth for the first UE is equal to a second channel bandwidth for the second UE.

Clause 45: The method of any one of Clauses 39-44, wherein the wireless node comprises a second UE, and communicating with the device using the frame format comprises: receiving the second data portion in the second symbol in a receiver window delayed in time from the second symbol by a length of the second gap when the frame format comprises the second gap, wherein a length of the second data portion is shortened for the second UE to receive the second data portion and the second GI in the second symbol in the receiver window.

Clause 46: The method of any one of Clauses 39-45, wherein the wireless node comprises a network entity, and communicating with the device using the frame format comprises: receiving the first data portion in the first symbol in a first receiver window aligned in time with the first symbol, wherein the network entity receives the first data portion and the first GI in the first symbol in the first receiver window; and receiving the second data portion in the second symbol in a second receiver window delayed in time from the second symbol by a length of the second gap when the frame format comprises the second gap, wherein a length of the second data portion is shortened for the second UE to receive the second data portion and the second GI in the second symbol in the second receiver window.

Clause 47: The method of any one of Clauses 39-46, wherein: the wireless node comprises a network entity; and the device comprises the first UE or the second UE.

Clause 48: The method of any one of Clauses 39-47, wherein: the wireless node comprises the first UE or the second UE; and the device comprises a network entity.

Clause 49: A method for wireless communication by a wireless node, comprising: communicating with a device using a frame format, the frame format comprising: a first symbol comprising a first data portion for a first user equipment (UE) and a first guard interval (GI) corresponding to the first UE, wherein the first GI is at least one of: later in time than the first data portion; or earlier in time than the first data portion; a second symbol later in time and adjacent in time to the first symbol, the second symbol comprising a second data portion for a second UE; and a second GI corresponding to the second UE, wherein the second GI is: when the first GI is later in time than the first data portion, part of the second symbol and earlier in time than the second data portion of the second symbol; or when the first GI is earlier in time than the first data portion, part of the first symbol and later in time than the first data portion of the first symbol.

Clause 50: The method of Clause 49, wherein when the first GI is earlier in time than the first data portion in the first symbol, the frame format further comprises: a third GI corresponding to the first UE as part of the second symbol and earlier in time than the second data portion of the second symbol; and a fourth GI corresponding to the second UE as part of the second symbol and later in time than the second data portion of the second symbol.

Clause 51: The method of Clause 50, wherein the wireless node comprises the first UE, and wherein the first UE communicates with the device using a first beam different than a second beam used by the second UE for communicating with the device when a length of the first GI and the second GI or a length of the second GI and the third GI is larger in time than a beam switching delay of the device.

Clause 52: The method of Clause 50 or 51, wherein: the first GI and the third GI are a same first length; and the second GI and the fourth GI are a same second length, wherein the first length is different than the second length.

Clause 53: The method of any one of Clauses 49-52, wherein: the first GI is a first length; and the second GI is a second length, wherein the first length is different than the second length.

Clause 54: The method of any one of Clauses 49-53, wherein: the first GI comprises a zero tail (ZT) GI, a zero head (ZH) GI, or a unique word (UW) GI; and the second GI comprises a ZT GI, a ZH GI, or a UW GI.

Clause 55: The method of any one of Clauses 49-54, wherein the wireless node comprises the first UE, and wherein the first UE communicates with the device using a same precoder used by the second UE for communicating with the device.

Clause 56: The method of any one of Clauses 49-55, wherein a first channel bandwidth for the first UE is equal to a second channel bandwidth for the second UE.

Clause 57: The method of any one of Clauses 49-56, wherein the wireless node comprises a second UE, and communicating with the device using the frame format comprises: receiving the second data portion in the second symbol in a receiver window delayed in time from the second symbol by a length of the second GI when the frame format comprises the first GI later in time than the first data portion in the first symbol.

Clause 58: The method of any one of Clauses 49-57, wherein the wireless node comprises a network entity, and communicating with the device using the frame format comprises: receiving the first data portion and the first GI in the first symbol in a first receiver window aligned in time with the first symbol; and receiving the second data portion in the second symbol in a second receiver window delayed in time from the second symbol by a length of the second GI when the frame format comprises the first GI later in time than the first data portion in the first symbol.

Clause 59: The method of any one of Clauses 50-58, wherein the wireless node comprises a first UE, and communicating with the device using the frame format comprises: receiving the first data portion in the first symbol in a receiver window delayed in time from the first symbol by a length of the first GI, wherein the first UE receives the first data portion and the second GI in the first symbol and the third GI in the second symbol in the receiver window.

Clause 60: The method of any one of Clauses 50-59, wherein the wireless node comprises a network entity, and communicating with the device using the frame format comprises: receiving the first data portion in the first symbol in a first receiver window delayed in time from the first symbol by a length of the first GI, wherein the network entity receives the first data portion and the second GI in the first symbol and the third GI in the second symbol in the first receiver window; and receiving the second data portion in the second symbol in a second receiver window aligned in time with the second symbol, wherein the network entity receives the third GI, the second data portion, and the fourth GI in the second symbol in the second receiver window, wherein the first receiver window and the second receiver window overlap in time.

Clause 61: The method of any one of Clauses 49-60, wherein: the wireless node comprises a network entity; and the device comprises the first UE or the second UE.

Clause 62: The method of any one of Clauses 49-61, wherein: the wireless node comprises the first UE or the second UE; and the device comprises a network entity.

Clause 63: An apparatus, comprising: a memory comprising executable instructions; and one or more processors configured to execute the executable instructions and cause the apparatus to perform a method in accordance with any one of Clauses 1-62.

Clause 64: An apparatus, comprising means for performing a method in accordance with any one of Clauses 1-62.

Clause 65: A non-transitory computer-readable medium comprising executable instructions that, when executed by one or more processors of an apparatus, cause the apparatus to perform a method in accordance with any one of Clauses 1-62.

Clause 66: A computer program product embodied on a computer-readable storage medium comprising code for performing a method in accordance with any one of Clauses 1-62.

Clause 67: A computer program comprising code for performing a method in accordance with any one of Clauses 1-62.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/ or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as BS 180 (e.g., gNB) may operate in a traditional sub-6 GHz spectrum, in millimeter wave (mmWave) frequencies, and/or near mmWave frequencies in communication with the UE 104. When the BS 180 operates in mmWave or near mm Wave frequencies, the BS 180 may be referred to as an mm Wave base station.

The communication links 120 between BSs 102 and, for example, UEs 104, may be through one or more carriers. For example, BSs 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communication network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Transmit processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A, 3B, 3C, and 3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology u, there are 14 symbols/slot and $2\mu$ slots/subframe. The subcarrier spacing and symbol length/duration are a function of the numerology. The subcarrier spacing may be equal to $2^\mu \times 15$ kHz, where u is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A, 3B, 3C, and 3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of communicating time division multiplexed (TDMed) user equipment (UE) data using guard interval (GI)-based waveforms in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user equipment (as in the example UE 104 of FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication comprising:
a memory; and
one or more processors coupled to the memory, the memory and the one or more processors being configured to cause the apparatus to:
communicate with a device using a frame format, the frame format comprising a first symbol, a second symbol, and a third symbol, wherein:
the first symbol comprises a first data portion for a first user equipment (UE) and a first guard interval (GI) corresponding to the first UE;
the third symbol comprises a second data portion for a second UE and a second GI corresponding to the second UE, wherein the third symbol is later in time than the first symbol; and
the second symbol comprises a gap or a reference signal (RS), a third GI corresponding to the first UE, and a fourth GI corresponding to the second UE, wherein the second symbol is between the first and third symbol in time.

2. The apparatus of claim 1, wherein the first GI is earlier in time than the first data portion for the first UE in the first symbol.

3. The apparatus of claim 1, wherein the second GI is later in time than the second data portion for the second UE in the third symbol.

4. The apparatus of claim 1, wherein:
the third GI is earlier in time than the gap or the RS in the second symbol; and
the fourth GI is later in time than the gap or the RS in the second symbol.

5. The apparatus of claim 1, wherein:
the first GI and the third GI are a same first length; and
the second GI and the fourth GI are a same second length.

6. The apparatus of claim 5, wherein the first length is different than the second length.

7. The apparatus of claim 5, wherein:
the first GI and the third GI each comprise a zero tail (ZT) GI, a zero head (ZH) GI, or a unique word (UW) GI; and
the second GI and the fourth GI each comprise a ZT GI, a ZH GI, or a UW GI.

8. The apparatus of claim 1, wherein the apparatus comprises the first UE, and wherein the memory and the one or more processors are configured to communicate with the device using a first precoder different than a second precoder used by the second UE for communicating with the device.

9. The apparatus of claim 1, wherein the apparatus comprises the first UE, and wherein the memory and the one or more processors are configured to communicate with the device using a first beam different than a second beam used by the second UE for communicating with the device.

10. The apparatus of claim 1, wherein a first channel bandwidth for the first UE is equal to a second channel bandwidth for the second UE.

11. The apparatus of claim 1, wherein the apparatus comprises the first UE, and wherein the memory and the one or more processors being configured to communicate with the device using the frame format further configured to:
receive the first data portion in the first symbol in a receiver window delayed in time from the first symbol by a length of the first GI, wherein the first UE receives the first data portion in the first symbol and the third GI in the second symbol in the receiver window.

12. The apparatus of claim 1, wherein the apparatus comprises a network entity, and wherein the memory and the one or more processors being configured to communicate with the device using the frame format further configured to:
receive the first data portion in the first symbol in a first receiver window delayed in time from the first symbol by a length of the first GI, wherein the network entity receives the first data portion in the first symbol and the third GI in the second symbol in the first receiver window; and
receive the second data portion in the third symbol in a second receiver window aligned in time with the third symbol, wherein the network entity receives the second data portion and the second GI in the third symbol in the second receiver window.

13. The apparatus of claim 1, wherein:
the apparatus comprises a network entity; and
the device comprises the first UE or the second UE.

14. The apparatus of claim 1, wherein:
the apparatus comprises the first UE or the second UE; and
the device comprises a network entity.

15. A method for wireless communication by a wireless node, comprising:
communicating with a device using a frame format, the frame format comprising a first symbol, a second symbol, and a third symbol, wherein:
the first symbol comprises a first data portion for a first user equipment (UE) and a first guard interval (GI) corresponding to the first UE;
the third symbol comprises a second data portion for a second UE and a second GI corresponding to the second UE, wherein the third symbol is later in time than the first symbol; and
the second symbol comprises a gap or a reference signal (RS), a third GI corresponding to the first UE, and a fourth GI corresponding to the second UE, wherein the second symbol is between the first and third symbol in time.

16. The method of claim 15, wherein the first GI is earlier in time than the first data portion for the first UE in the first symbol.

17. The method of claim 15, wherein the second GI is later in time than the second data portion for the second UE in the second symbol.

18. The method of claim 15, wherein:
the third GI is earlier in time than the gap or the RS in the second symbol; and
the fourth GI is later in time than the gap or the RS in the second symbol.

19. The method of claim 15, wherein:
the first GI and the third GI are a same first length; and
the second GI and the fourth GI are a same second length.

20. The method of claim 19, wherein the first length is different than the second length.

21. The method of claim 19, wherein:
the first GI and the third GI each comprise a zero tail (ZT) GI, a zero head (ZH) GI, or a unique word (UW) GI; and
the second GI and the fourth GI each comprise a ZT GI, a ZH GI, or a UW GI.

22. The method of claim 15, wherein the wireless node comprises the first UE, and wherein the first UE communicates with the device using a first precoder different than a second precoder used by the second UE for communicating with the device.

23. The method of claim 15, wherein the wireless node comprises the first UE, and wherein the first UE communicates with the device using a first beam different than a second beam used by the second UE for communicating with the device.

24. The method of claim 15, wherein a first channel bandwidth for the first UE is equal to a second channel bandwidth for the second UE.

25. The method of claim 15, wherein the wireless node comprises the first UE, and communicating with the device using the frame format comprises:
receiving the first data portion in the first symbol in a receiver window delayed in time from the first symbol by a length of the first GI, wherein the first UE receives the first data portion in the first symbol and the third GI in the second symbol in the receiver window.

26. The method of claim 15, wherein the wireless node comprises a network entity, and communicating with the device using the frame format comprises:
receiving the first data portion in the first symbol in a first receiver window delayed in time from the first symbol by a length of the first GI, wherein the network entity receives the first data portion in the first symbol and the third GI in the second symbol in the first receiver window; and
receiving the second data portion in the third symbol in a second receiver window aligned in time with the third symbol, wherein the network entity receives the second data portion and the second GI in the third symbol in the second receiver window.

27. The method of claim 15, wherein:
the wireless node comprises a network entity; and
the device comprises the first UE or the second UE.

28. The method of claim 15, wherein:
the wireless node comprises the first UE or the second UE; and
the device comprises a network entity.

29. An apparatus for wireless communication comprising:
means for communicate with a device using a frame format, the frame format comprising a first symbol, a second symbol, and a third symbol, wherein:
the first symbol comprises a first data portion for a first user equipment (UE) and a first guard interval (GI) corresponding to the first UE;
the third symbol comprises a second data portion for a second UE and a second GI corresponding to the second UE, wherein the third symbol is later in time than the first symbol; and
the second symbol comprises a gap or a reference signal (RS), a third GI corresponding to the first UE, and a fourth GI corresponding to the second UE, wherein the second symbol is between the first and third symbol in time.

30. A non-transitory computer-readable medium having computer executable instructions stored thereon to cause a wireless node to:
communicate with a device using a frame format, the frame format comprising a first symbol, a second symbol, and a third symbol, wherein:
the first symbol comprises a first data portion for a first user equipment (UE) and a first guard interval (GI) corresponding to the first UE;
the third symbol comprises a second data portion for a second UE and a second GI corresponding to the second UE, wherein the third symbol is later in time than the first symbol; and
the second symbol comprises a gap or a reference signal (RS), a third GI corresponding to the first UE, and a fourth GI corresponding to the second UE, wherein the second symbol is between the first and third symbol in time.

* * * * *